United States Patent
Yamamoto et al.

(10) Patent No.: US 10,484,985 B2
(45) Date of Patent: *Nov. 19, 2019

(54) TERMINAL, BASE STATION, TRANSMISSION METHOD, AND RECEPTION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP); Alexander Golitschek Edler von Elbwart, Hessen (DE); Seigo Nakao, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/144,770

(22) Filed: Sep. 27, 2018

(65) Prior Publication Data

US 2019/0037543 A1 Jan. 31, 2019

Related U.S. Application Data

(63) Continuation of application No. 15/299,366, filed on Oct. 20, 2016, now Pat. No. 10,117,236, which is a (Continued)

(30) Foreign Application Priority Data

May 9, 2014 (JP) .................................. 2014-097420

(51) Int. Cl.
*H04W 4/06* (2009.01)
*H04W 72/04* (2009.01)
(Continued)

(52) U.S. Cl.
CPC .......... *H04W 72/042* (2013.01); *H04B 1/707* (2013.01); *H04J 11/00* (2013.01);
(Continued)

(58) Field of Classification Search
CPC ....... H04W 72/042; H04W 4/30; H04W 4/70; H04W 72/04; H04W 4/04; H04J 13/004;
(Continued)

(56) References Cited

U.S. PATENT DOCUMENTS 8,553,671 B2 * 10/2013 Kim ........................ H04J 13/16
 370/344
9,414,366 B2 * 8/2016 Pajukoski ......... H04W 72/0466
(Continued)

FOREIGN PATENT DOCUMENTS

EP 2 194 654 A1 6/2010
EP 2 216 953 A1 8/2010
(Continued)

OTHER PUBLICATIONS

3GPP TS 36.211 V11.5.0, "3$^{rd}$ Generation Partnership Project; Technical Specification Group Radio Access Network; Evolved Universal Terrestrial Radio Access (E-UTRA); Physical channels and modulation (Release 11)", Dec. 2013, 120 pages.
(Continued)

*Primary Examiner* — Phuc H Tran
(74) *Attorney, Agent, or Firm* — Seed IP Law Group LLP

(57) ABSTRACT

A plurality of the same signals to be repetitively transmitted over multiple subframes are multiplied, in each subframe, by one of components of one sequence of a plurality of orthogonal sequences orthogonal to each other thereby generating a transmission signal. The generated transmission signal is transmitted.

20 Claims, 11 Drawing Sheets

Related U.S. Application Data continuation of application No. PCT/JP2015/001292, filed on Mar. 10, 2015.

(51) Int. Cl.
| | |
|---|---|
| *H04B 1/707* | (2011.01) |
| *H04J 11/00* | (2006.01) |
| *H04J 13/18* | (2011.01) |
| *H04L 1/08* | (2006.01) |
| *H04W 4/70* | (2018.01) |
| *H04J 13/00* | (2011.01) |
| *H04W 4/30* | (2018.01) |

(52) U.S. Cl.
CPC ........ *H04J 13/004* (2013.01); *H04J 13/0074* (2013.01); *H04J 13/18* (2013.01); *H04L 1/08* (2013.01); *H04W 4/30* (2018.02); *H04W 4/70* (2018.02); *H04W 72/04* (2013.01)

(58) Field of Classification Search
CPC ........ H04J 13/0074; H04J 13/18; H04J 11/00; H04L 1/08; H04B 1/707
See application file for complete search history.

(56) References Cited

U.S. PATENT DOCUMENTS

| | | | |
|---|---|---|---|
| 2010/0232473 A1 | 9/2010 | Nakao et al. | |
| 2010/0254253 A1* | 10/2010 | Sun | H04L 5/0019 370/210 |
| 2012/0002568 A1 | 1/2012 | Tiirola et al. | |
| 2015/0036651 A1 | 2/2015 | Takeda et al. | |

FOREIGN PATENT DOCUMENTS

| | | |
|---|---|---|
| JP | 2012-520645 A | 9/2012 |
| JP | 2012-222723 A | 11/2012 |
| JP | 2013-085151 A | 5/2013 |
| WO | 99/05797 A2 | 2/1999 |
| WO | 2009/041029 A1 | 4/2009 |
| WO | 2013/056741 A1 | 4/2013 |
| WO | 2013/158005 A1 | 10/2013 |

OTHER PUBLICATIONS

3GPP TS 36.212 V11.4.0, "3$^{rd}$ Generation Partnership Project; Technical Specification Group Radio Access (E-UTRA); Multiplexing and channel coding (Release 11)", Dec. 2013, 84 pages.

3GPP TS 36.213 V11.5.0, "3$^{rd}$ Generation Partnership Project; Technical Specification Group Radio Access Network; Evolved Universal Terrestrial Radio Access (E-UTRA); Physical layer procedures (Release 11)", Dec. 2013, 182 pages.

3GPP TR 36.888 V12.0.0, "3$^{rd}$ Generation Partnership Project; Technical Specification Group Radio Access Network; Study on provision of low-cost Machine-Type Communications (MTC) User Equipments (UEs) based on LTE, (Release 12)", Jun. 2013, 55 pages.

Extended European Search Report, dated Apr. 7, 2017, for corresponding European Application No. 15789011.2-1874 / 3142274, 8 pages.

International Search Report of PCT application No. PCT/JP2015/001292 dated Apr. 14, 2015, 4 pages. (With English Translation).

R1-140498, Panasonic, "Proposal of common coverage enhanced subframe length", 3GPP TSG RAN WG1 Meeting #76, Agenda Item 7.2.2.2, Prague, Czech Republic, Feb. 10-14, 2014, 1 page.

R1-144108, Panasonic, "Multiple subframe code spreading for MTC UEs", 3GPP TSG RAN WG1 Meeting #78bis, Agenda Item 7.3.1.2.1, Ljubljana, Slovenia, Oct. 6-10, 2014, 5 pages.

Seigo Nakao et al., "Performance enhancement of E-UTRA upling control channel in fast fading environments", Proceeding of 2009 IEEE 69th Vehicular Technology Conference (VTC2009—Spring), Apr. 2009, 5 pages.

\* cited by examiner

FIG. 12

| MCS Index $I_{MCS}$ | Modulation Order $Q_m$ | TBS Index $I_{TBS}$ | MCS Index $I_{MCS}$ | Modulation Order $Q_m$ | TBS Index $I_{TBS}$ |
|---|---|---|---|---|---|
| 0 | 2 | 0 | 16 | 4 | 15 |
| 1 | 2 | 1 | 17 | 6 | 15 |
| 2 | 2 | 2 | 18 | 6 | 16 |
| 3 | 2 | 3 | 19 | 6 | 17 |
| 4 | 2 | 4 | 20 | 6 | 18 |
| 5 | 2 | 5 | 21 | 6 | 19 |
| 6 | 2 | 6 | 22 | 6 | 20 |
| 7 | 2 | 7 | 23 | 6 | 21 |
| 8 | 2 | 8 | 24 | 6 | 22 |
| 9 | 2 | 9 | 25 | 6 | 23 |
| 10 | 4 | 9 | 26 | 6 | 24 |
| 11 | 4 | 10 | 27 | 6 | 25 |
| 12 | 4 | 11 | 28 | 6 | 26 |
| 13 | 4 | 12 | 29 | 2 | reserved |
| 14 | 4 | 13 | 30 | 4 | |
| 15 | 4 | 14 | 31 | 6 | |

TERMINAL, BASE STATION, TRANSMISSION METHOD, AND RECEPTION METHOD

BACKGROUND

1. Technical Field

The present disclosure relates to a terminal, a base station, a transmission method and a reception method.

2. Description of the Related Art

In 3rd Generation Partnership Project Long Term Evolution (3GPP LTE), orthogonal frequency division multiple access (OFDMA) is used as a downlink communication method, while single carrier-FDMA (SC-FDMA) is used as an uplink communication method.

In a downlink of 3GPP LTE, a synchronization channel (SCH), a physical broadcast channel (PBCH), a physical downlink control channel (PDCCH), a physical downlink shared channel (PDSCH), a physical multicast channel (PMCH), a physical control format indicator channel (PCFICH), and a physical hybrid automatic repeat request indicator channel (PHICH) are used. In an uplink of 3GPP LTE, a physical uplink control channel (PUCCH), a physical uplink shared channel (PUSCH), and physical random access channel (PRACH) are used.

A terminal (also referred to as user equipment (UE)) first catches SCH to establish synchronization with a base station (also referred to as eNB). Thereafter, the terminal reads BCH information (broadcast information) to acquire a parameter specific to the base station (see, for example, 3GPP TS 36.211 V11.5.0, "Physical channels and modulation (Release 11)," December 2013; 3GPP TS 36.212 V11.4.0, "Multiplexing and channel coding (Release 11)," December 2013; and 3GPP TS 36.213 V11.5.0, "Physical layer procedures (Release 11)," December 2013). After acquiring the parameter specific to the base station, the terminal sends a connection request to the base station via PRACH to establish communication with the base station. To the terminal for which communication has been established, the base station transmits, as required, control information via a control channel such as PDCCH or the like. The control information transmitted here from the base station includes information on resources allocated to the terminal by the base station, modulation and channel coding scheme (MCS) information, hybrid automatic repeat request (HARQ) process information, transmission power control information, terminal ID information, and the like.

In LTE, control signals and data signals are transmitted in units of subframes.

In LTE, HARQ is applied to downlink data from the base station to the terminal, and, in response to a downlink data signal, an acknowledgement (ACK) or a negative acknowledgement (NACK) is transmitted using an uplink channel such as PUCCH or the like. ACK or NACK (also referred to ACK/NACK signal or a response signal) is, for example, 1-bit information indicating ACK (no error) or NACK (error).

Multiple response signals transmitted from multiple terminals are spread, in a time domain, using a zero auto-correlation (ZAC) sequence having a zero auto-correlation characteristic, a Walsh sequence, and a discrete Fourier transform (DFT) sequence, as illustrated in FIG. 1, and are code-multiplexed in PUCCH. In FIG. 1, (W(0), W(1), W(2), W(3)) denotes a Walsh sequence with a sequence length of 4, and (F(0), F(1), F(2)) denotes a DFT sequence with a sequence length of 3.

As shown in FIG. 1, in the terminal, the ACK/NACK signal is first primarily spread in a frequency domain, using a ZAC sequence (with a sequence length of 12) into frequency components corresponding to 1SC-FDMA symbol. That is, the ZAC sequence with a sequence length of 12 is multiplied by the ACK/NACK signal components represented by complex numbers. Next, the primarily-spread ACK/NACK signal and the ZAC sequence functioning as a reference signal are respectively secondarily spread using a Walsh sequence (with a sequence length of 4: W(0) to W(3)) and a DFT sequence (with a sequence length of 3: F(0) to F(2)). That is, respective components of a signal with a sequence length of 12 (the primarily spread ACK/NACK signal or the ZAC sequence functioning as the reference signal) are multiplied by respective components of an orthogonal sequence (a Walsh sequence or a DFT sequence). Furthermore, the secondarily-spread signal is subjected to an inverse discrete Fourier transform (IDFT) or an inverse Fast Fourier transform (IFFT) thereby being converted into a signal with a sequence length of 12 in the time domain. Thereafter, a cyclic prefix (CP) is added to each signal having subjected to IFFT, and thus a 1-slot signal including 7 SC-FDMA symbols is formed.

PUCCH is located at each edge of a system band in the frequency domain. A resource for PUCCH is allocated, on a subframe-by-subframe basis, to each terminal. 1 subframe includes 2 slots, and PUCCH has frequency hopping (inter-slot frequency hopping) between a first slot and a second slot.

ACK/NACK signals from different terminals are spread using ZAC sequences defined by different cyclic shift indexes and orthogonal sequences corresponding to different orthogonal cover indexes (OC indexes). The orthogonal sequence is a combination of a Walsh sequence and a DFT sequence. Note that the orthogonal sequence is also called a block-wise spreading code sequence. Thus, by using despreading and correlation processing, the base station is capable of demultiplexes these code-multiplexed ACK/NACK signals (see, for example, Seigo Nakao, Tomofumi Takata, Daichi Imamura, and Katsuhiko Hiramatsu, "Performance enhancement of E-UTRA uplink control channel in fast fading environments," Proceeding of 2009 IEEE 69th Vehicular Technology Conference (VTC2009-Spring), April 2009). FIG. 2 illustrates PUCCH resources defined by orthogonal cover indexes (OC index of 0 to 2) of an orthogonal sequence and cyclic shift indexes (0 to 11) of a ZAC sequence. In the case where a Walsh sequence with a sequence length of 4 and a DFT sequence with a sequence length of 3 are used, up to 3*12=36 PUCCH resources can be defined in the same time-frequency resource. However, all 36 PUCCH resources are not necessarily usable.

By the way, in recent years, it has been expected to realize, as a mechanism for supporting a future information society, machine-to-machine (M2M) communication to provide autonomous communication service between devices without a user intervening. A specific example of an application of an M2M system is a smart grid. The smart grid is an infrastructure system that efficiently supplies a lifeline such as electric power, gas, or the like. In the smart grid, M2M communication is performed between a smart meter installed in each family house or building and a central server to adjust a resource supply-demand balance in an autonomous and effective manner. Other examples of applications of the M2M communication system include a monitoring system for use in commodity management, telemedicine, or the like, remote management of a vending machine in terms of inventory or charging.

In the M2M communication system, an attention is on use of a cellular system that provides a particularly wide communication area. In 3GPP, in standardization of LTE and LTE-Advanced, M2M based on the cellular network is being discussed under the name of Machine Type Communication (MTC). In particular, further expanding the communication area is under discussion to handle a case where an MTC communication device such as a smart meter is installed at a location such as a basement of a building or the like that is not converted by the existing communication area (see, for example, 3GPP TR 36.888 V12.0.0, "Study on provision of low-cost Machine-Type Communications (MTC) User Equipments (UEs) based on LTE," June 20135). For example, to achieve a further expansion of the communication area, it is under discussion to perform a repetition communication in which the same signal is repetitively transmitted multiple times.

SUMMARY

As described above, to achieve the expansion of the communication area in MTC (hereinafter, also referred to as coverage enhancement), it is under consideration that a control signal or a data signal is repetitively transmitted over multiple subframes. However, in the repetition transmission, one terminal occupies multiple subframes to transmit a control signal or a data signal, and thus a reduction in spectral efficiency occurs. Furthermore, as described above, for example, in PUCCH, signals from different terminals are code-multiplexed using different cyclic shift indexes and orthogonal sequences (that is, different PUCCH resources). However, in the MTC system, there is a possibility that a huge number of terminals are located within a cell. Such an increase in the number of terminals may result in a shortage of resources.

One non-limiting and exemplary embodiment provides a terminal, a base station, a transmission method, and a reception method, capable of performing repetition transmission while suppressing a reduction in spectral efficiency and resource shortage.

In one general aspect, the techniques disclosed here feature a terminal including a generator that generates a transmission signal by multiplying, in each subframe, a signal to be repetitively transmitted over multiple subframes by one of components of one sequence of a plurality of first sequences orthogonal to each other, and a transmitter that transmits the transmission signal.

According to one general aspect of the present disclosure, it is possible to perform repetition transmission while suppressing a reduction in spectral efficiency and resource shortage.

It should be noted that general or specific embodiments may be implemented as a system, a method, an integrated circuit, a computer program, a storage medium, or any selective combination thereof.

Additional benefits and advantages of the aspect of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 illustrates an example of MCS information.

DETAILED DESCRIPTION

Embodiments of the present disclosure are described in detail below with reference to drawings. In the embodiments, similar constituent elements are denoted by similar reference symbols, and a duplicated description thereof is omitted.

Outline of Communication System

In the following description, a frequency division duplex (FDD) system is taken as an example.

A communication system according to each embodiment of the disclosure is, for example, a system supporting LTE-Advanced, and includes a base station 100 and a terminal 200.

For example, in a case where MTC coverage enhancement mode is applied, the terminal 200 performs repetition transmission of an ACK/NACK signal in PUCCH. In the repetition transmission, for example, one repetition includes a signal in one subframe, and the same signal is transmitted multiple times. That is, the terminal 200 repetitively transmits the same ACK/NACK signal as many times as a predetermined number of repetitions (Repetition Factor) over as many successive subframes as the number of repetitions.

Figure 3:
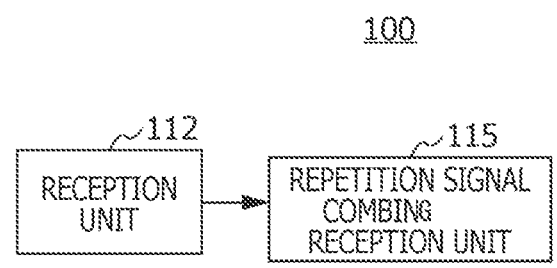
FIG. 3 illustrates a configuration of main parts of a base station according to a first embodiment.

FIG. 3 is a block diagram illustrating a configuration of main parts of the base station 100 according to one of the embodiments of the present disclosure. In the base station 100 shown in FIG. 3, a reception unit 112 receives a signal repetitively transmitted over multiple subframes. This signal is a signal that has been multiplied, in each subframe, by one of component of one of a plurality of first sequences (inter-subframe orthogonal sequences described later) orthogonal to each other in multiple subframes. The repetition signal combining reception unit 115 coherently combines the signals in multiple subframes by using the one of sequences thereby generating a combined signal.

Figure 4:
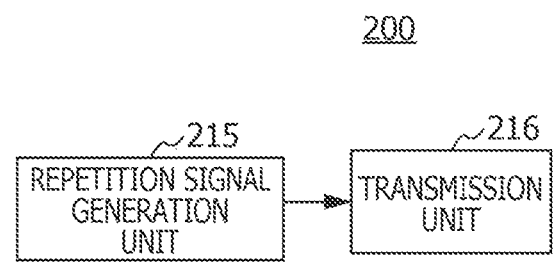
FIG. 4 illustrates a configuration of main parts of a terminal according to the first embodiment.

FIG. 4 is a block diagram illustrating a configuration of main parts of the terminal 200 according to one of the embodiments of the present disclosure. In the terminal 200 shown in FIG. 4, a repetition signal generation unit 215 multiplies, in each subframe, a signal to be repetitively transmitted over multiple subframes by one of components of one sequence of a plurality of first sequences (inter-subframe orthogonal sequences described later) orthogonal to each other in multiple subframes thereby generating a transmission signal. The transmission unit 216 transmits the transmission signal.

First Embodiment

Configuration of Base Station

Figure 5:
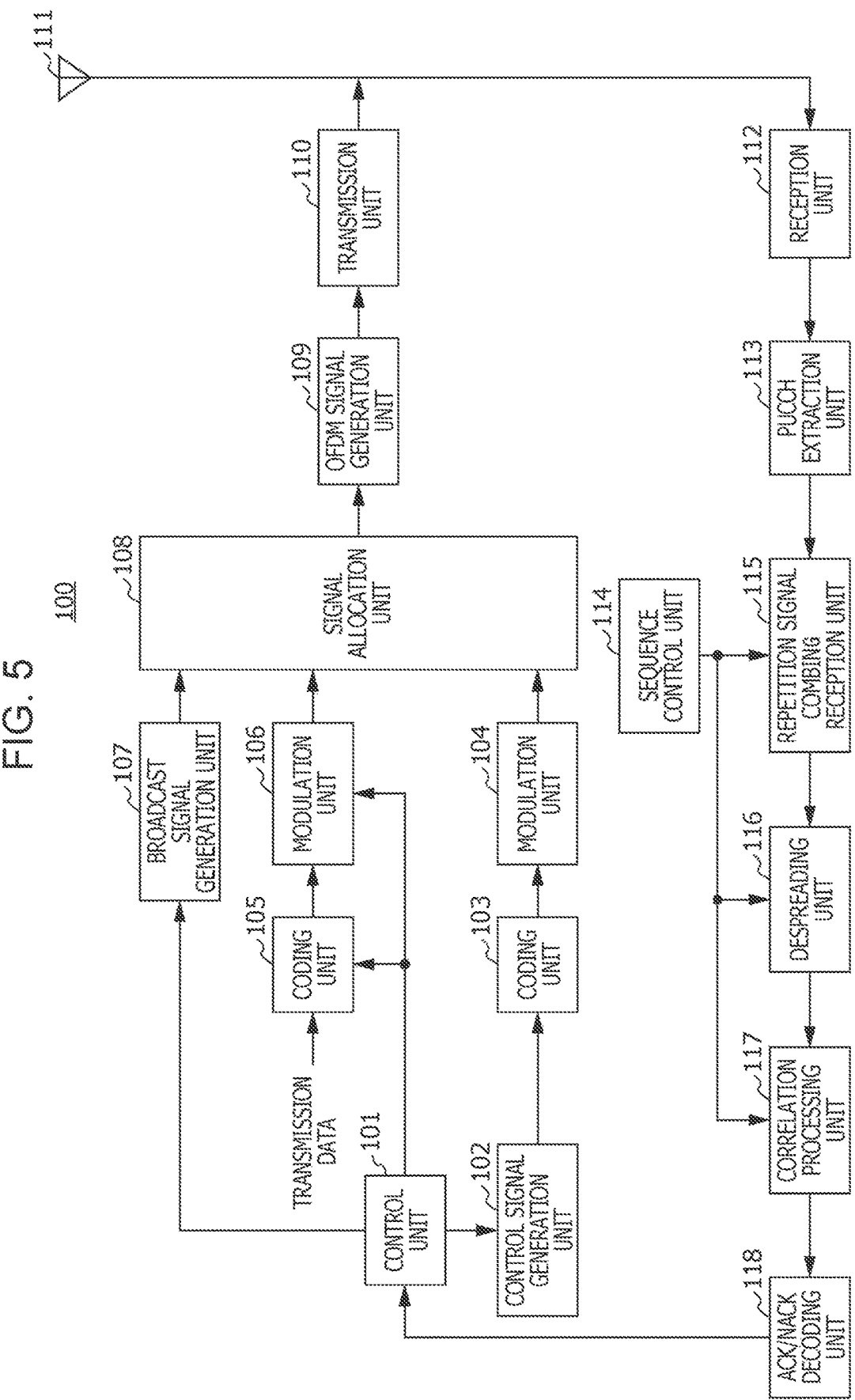
FIG. 5 illustrates a configuration of a base station according to the first embodiment.

FIG. 5 is a block diagram illustrating a configuration of the base station 100 according to the first embodiment of the present disclosure. In FIG. 5, the base station 100 includes a control unit 101, a control signal generation unit 102, a coding unit 103, a modulation unit 104, a coding unit 105, a modulation unit 106, a broadcast signal generation unit 107, a signal allocation unit 108, an OFDM (Orthogonal Frequency Division Multiplexing) signal generation unit 109, a transmission unit 110, an antenna 111, a reception unit 112, a PUCCH extraction unit 113, a sequence control unit 114, a repetition signal combining reception unit 115, a despreading unit 116, a correlation processing unit 117, and an ACK/NACK decoding unit 118.

The control unit 101 allocates the terminal 200 a downlink resource (downlink control information allocation resource) for use in transmitting control information and a downlink resource (downlink data allocation resource) for use in transmitting downlink data indicated by the control information. The downlink control information allocation resource is selected within a resource area in which PDCCH for MTC or EPDCCH is mapped. The downlink data allocation resource is selected within a resource area in which PDSCH is mapped. In a case where there are multiple terminals 200, the control unit 101 allocates different resources to the respective terminals 200.

The control unit 101 outputs, to the control signal generation unit 102, control information such as information associated with the downlink data allocation resource, information associated with MCS, information associated with the HARQ process, and information associated with control of transmission power of PUCCH. Furthermore, the control unit 101 outputs information associated with MCS to the coding unit 105 and the modulation unit 106. The control unit 101 also instructs the broadcast signal generation unit 107 to generate a broadcast signal based on a parameter predetermined for each base station. The control unit 101 also generates information associated with the PUCCH resource and outputs it to the control signal generation unit 102.

The control unit 101 also generates, to the terminal 200 to which a coverage enhancement mode is set, information associated with the inter-subframe orthogonal sequence (inter-subframe orthogonal sequence information). The "inter-subframe orthogonal sequence" is an orthogonal sequence that is multiplied on the signal repetitively transmitted over multiple subframes. That is, the repetitively transmitted signal in each subframe is multiplied by respective components of the inter-subframe orthogonal sequence. ACK/NACK signals from different terminals 200 are spread using inter-subframe orthogonal sequences corresponding to different orthogonal cover indexes (hereinafter, referred to as SF-OC index). That is, the control unit 101 assigns each terminal 200 one of multiple inter-subframe orthogonal sequences orthogonal to each other in multiple subframes over which repetition transmission is performed.

To distinguish from the inter-subframe orthogonal sequence, hereinafter, the above-described orthogonal sequence (see FIG. 1) used in the subframe (in each slot) is referred to as "intra-subframe orthogonal sequence".

In a case where SF-OC index is indicated using PDCCH, the control unit 101 outputs inter-subframe orthogonal sequence information including the SF-OC index to the control signal generation unit 102. Note that the base station 100 may use a higher layer to indicate the inter-subframe orthogonal sequence information including the SF-OC index to the terminal 200.

Furthermore, when the control unit 101 receives ACK from the ACK/NACK decoding unit 118, the control unit 101 instructs a transmission data control unit (not shown) to transmit new transmission data. On the other hand, when the control unit 101 receives NACK or discontinuous transmission (DTX) from the ACK/NACK decoding unit 118, the control unit 101 instructs a transmission data control unit to transmit the previously transmitted transmission data.

The control signal generation unit 102 generates a control signal to be allocated to PDCCH by using the information received from the control unit 101, and outputs the control signal to the coding unit 103.

The coding unit 103 performs error correction coding such as convolutional coding or the like on the control signal received from the control signal generation unit 102, and outputs the coded control signal to the modulation unit 104.

The modulation unit 104 performs a modulation process on the control signal received from the coding unit 103, and outputs the modulated control signal to the signal allocation unit 108.

The coding unit 105 performs error correction coding such as turbo cording or the like on the transmission data (the bit sequence, that is, the downlink data) according to a coding rate included in the information associated with MCS received from the control unit 101, and outputs a resultant coded bit sequence to the modulation unit 106.

The modulation unit 106 performs a data modulation process on the coded bit sequence received from the coding unit 105 according to a modulation order included in the information associated with MCS received from the control unit 101, and outputs a resultant data modulation signal to the signal allocation unit 108.

The broadcast signal generation unit 107 generates a broadcast signal according to the instruction from the control unit 101, and outputs the broadcast signal to the signal allocation unit 108. Note that the broadcast signal may be subjected to a coding process and a modulation process.

The signal allocation unit 108 maps the control signal received from the modulation unit 104, the data modulation signal received from the modulation unit 106, and the broadcast signal received from the broadcast signal generation unit 107 to downlink resources (downlink data signal allocation resource, downlink control information allocation resource, and the like), and the signal allocation unit 108 outputs the mapped signals to the OFDM signal generation unit 109.

The OFDM signal generation unit 109 performs a mapping-to-subcarrier process and an IFFT process on the signals received from the signal allocation unit 108 thereby generating an OFDM signal in the time domain. The OFDM signal generation unit 109 outputs the generated OFDM signal to the transmission unit 110.

The transmission unit 110 performs a radio frequency (RF) process such as a digital-to-analog (D/A) conversion, an up-conversion, and the like on the OFDM signal received from the OFDM signal generation unit 109, and the transmission unit 110 transmits the radio signal to the terminal 200 via the antenna 111.

The reception unit 112 performs an RF process such as a down-conversion or an analog-to-digital (A/D) conversion, or the like, on the radio signal received from the terminal 200 via the antenna 111, and the reception unit 112 outputs a resultant baseband SC-FDMA signal to the PUCCH extraction unit 113.

The PUCCH extraction unit 113 perform an FFT process on the SC-FDMA signal received from the reception unit 112 thereby converting it into a signal in the frequency domain. Furthermore, the PUCCH extraction unit 113 extracts PUCCH from the signal subjected to FFT, and outputs the extracted PUCCH to the repetition signal combining reception unit 115.

The sequence control unit 114 generates a ZAC sequence having a possibility of being used in spreading the ACK/NACK signal and the reference signal transmitted from the terminal 200, an intra-subframe orthogonal sequence, and an inter-subframe orthogonal sequence. The sequence control unit 114 outputs the inter-subframe orthogonal sequence to the repetition signal combining reception unit 115, the intra-subframe orthogonal sequence to the despreading unit 116, and the ZAC sequence to the correlation processing unit 117. Note that sequences other than ZAC sequence may be employed as long as the sequences are defined by amounts of cyclic shift different from each other. Furthermore, sequences other than the Walsh sequence may be employed as long as sequences are orthogonal to each other.

Using the inter-subframe orthogonal codes received from the sequence control unit 114, the repetition signal combining reception unit 115 coherently combines signals corresponding to the ACK/NACK signal and the reference signal in PUCCH (the ACK/NACK signal and the reference signal) repetitively transmitted over a plurality of subframes thereby generating a combined signal. The repetition signal combination reception unit 115 outputs the resultant coherently combined signal to the despreading unit 116. Note that in a case where the base station 100 has not recognized the inter-subframe orthogonal sequence used in the terminal 200, the sequence control unit 114 may sequentially output multiple inter-subframe orthogonal sequences, and the repetition signal combining reception unit 115 may perform a process (that is, a blind process) using the sequentially received inter-subframe orthogonal sequences until succeeding in correctly performing the coherent combining. On the other hand, in a case where the base station 100 has recognized the inter-subframe orthogonal sequence used in the terminal 200, the sequence control unit 114 outputs the above-described inter-subframe orthogonal sequence of the multiple inter-subframe orthogonal sequences, and the repetition signal combining reception unit 115 performs the coherent combining process using the received inter-subframe orthogonal sequence. For example, in a case where the inter-subframe orthogonal sequence is indicated to the terminal 200 using PDCCH or EPDCCH for MTC, the sequence control unit 114 may receive the inter-subframe orthogonal sequence information from the control signal generation unit 102 (not shown in the figures).

The despreading unit 116 despreads a signal, included in the signal received from the repetition signal combining reception unit 115 and corresponding to the ACK/NACK signal, by using the intra-subframe orthogonal sequence received from the sequence control unit 114, and the despreading unit 116 outputs the despread signal to the correlation processing unit 117.

The correlation processing unit 117 determines, using the ZAC sequence input from the sequence control unit 114, a correlation value between the signal input from the despreading unit 116 and the ZAC sequence having a possibility of being used by the terminal 200 in the primary spreading, and the correlation processing unit 117 outputs the correlation value to the ACK/NACK decoding unit 118.

The ACK/NACK decoding unit 118 performs a determination, based on the correlation value received from the correlation processing unit 117 as to whether the ACK/NACK signal transmitted from the terminal 200 indicates ACK or NACK in response to the transmitted data or DTX. The ACK/NACK decoding unit 118 outputs a determination result to the control unit 101.

Configuration of Terminal

Figure 6:
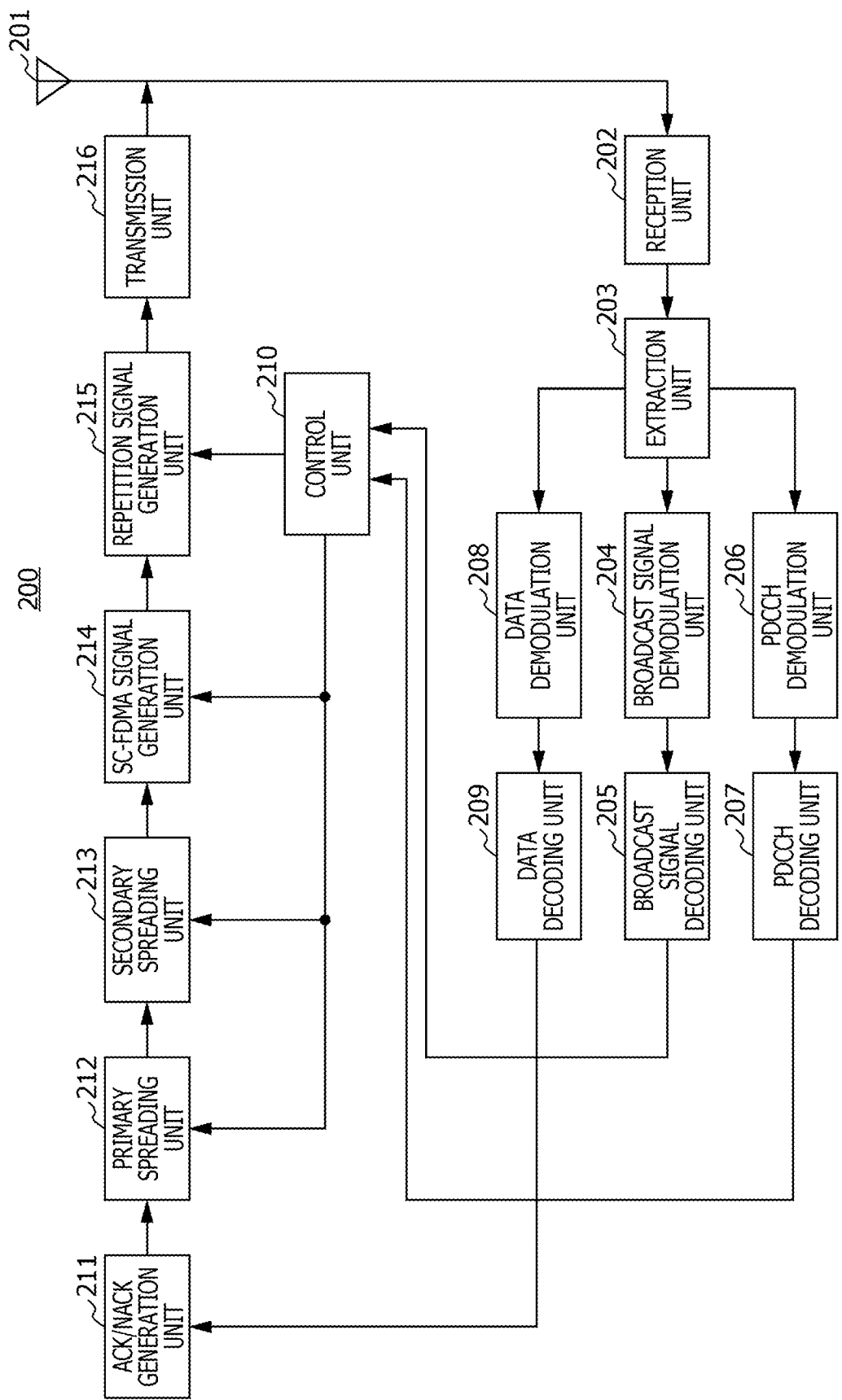
FIG. 6 illustrates a configuration of a terminal according to the first embodiment.

FIG. 6 is a block diagram illustrating a configuration of the terminal 200 according to the first embodiment of the present disclosure. In FIG. 6, the terminal 200 includes an antenna 201, a reception unit 202, an extraction unit 203, a broadcast signal demodulation unit 204, a broadcast signal decoding unit 205, a PDCCH demodulation unit 206, a PDCCH decoding unit 207, a data demodulation unit 208, a data decoding unit 209, a control unit 210, an ACK/NACK generation unit 211, a primary spreading unit 212, a secondary spreading unit 213, a SC-FDMA signal generation unit 214, a repetition signal generation unit 215, and a transmission unit 216.

The reception unit 202 performs an RF process such as a down-conversion, an AD conversion, or the like on the radio signal received from the base station 100 via the antenna 201 thereby obtaining a baseband OFDM signal. The reception unit 202 outputs the OFDM signal to the extraction unit 203.

The extraction unit 203 extracts a broadcast signal from the received signal received from the reception unit 202 and outputs it to the broadcast signal demodulation unit 204. Here a resource to which the broadcast signal is mapped is determined in advance, and thus extraction unit 203 obtains the broadcast signal by extracting information mapped to this resource. The extracted broadcast signal includes, for example, information associated with a system bandwidth. Furthermore, the extraction unit 203 extracts PDCCH or EPDCCH signal for MTC from the received signal received from the reception unit 202, and outputs it to the PDCCH demodulation unit 206. Furthermore, the extraction unit 203 extracts downlink data from the received signal received from the reception unit 202 based on information associated with the downlink data allocation resource addressed to the present terminal, and the extraction unit 203 outputs it to the data demodulation unit 208.

The broadcast signal demodulation unit 204 demodulates the broadcast signal received from the extraction unit 203 and outputs the demodulated broadcast signal to the broadcast signal decoding unit 205.

The broadcast signal decoding unit 205 decodes the broadcast signal received from the broadcast signal demodulation unit 204 thereby obtaining the broadcast signal including information such as the system bandwidth or the like. The broadcast signal decoding unit 205 outputs the obtained broadcast signal to the control unit 210.

The PDCCH demodulation unit 206 demodulates the PDCCH or EPDCCH signal for MTC received from the extraction unit 203, and outputs the demodulated PDCCH or EPDCCH signal for MTC to the PDCCH decoding unit 207.

The PDCCH decoding unit 207 decodes the PDCCH or EPDCCH signal for MTC received from the PDCCH demodulation unit 206. Furthermore, the PDCCH decoding unit 207 performs a blind determination as to whether control information included in the decoding result is control information addressed to the present terminal. After the blind determination, the PDCCH decoding unit 207 outputs the control information addressed to the present terminal to the control unit 210.

The data demodulation unit 208 performs a demodulation process on the downlink data received from the extraction unit 203 thereby obtaining data. The data demodulation unit 208 outputs the data to the data decoding unit 209.

The data decoding unit 209 performs an error correction process such as turbo decoding and an error detection process such as a cyclic redundancy check (CRC) on the data received from the data demodulation unit 208. The data decoding unit 209 outputs the obtained error detection result to the ACK/NACK generation unit 211.

The control unit 210 identifies the PUCCH resource (frequency and codes used in the primary spreading/secondary spreading) based on the broadcast signal received from the broadcast signal decoding unit 205 or the control information received from the PDCCH decoding unit 207. Note that the PUCCH resource may be indicated in advance to the terminal 200 from the base station 100.

Figure 2:
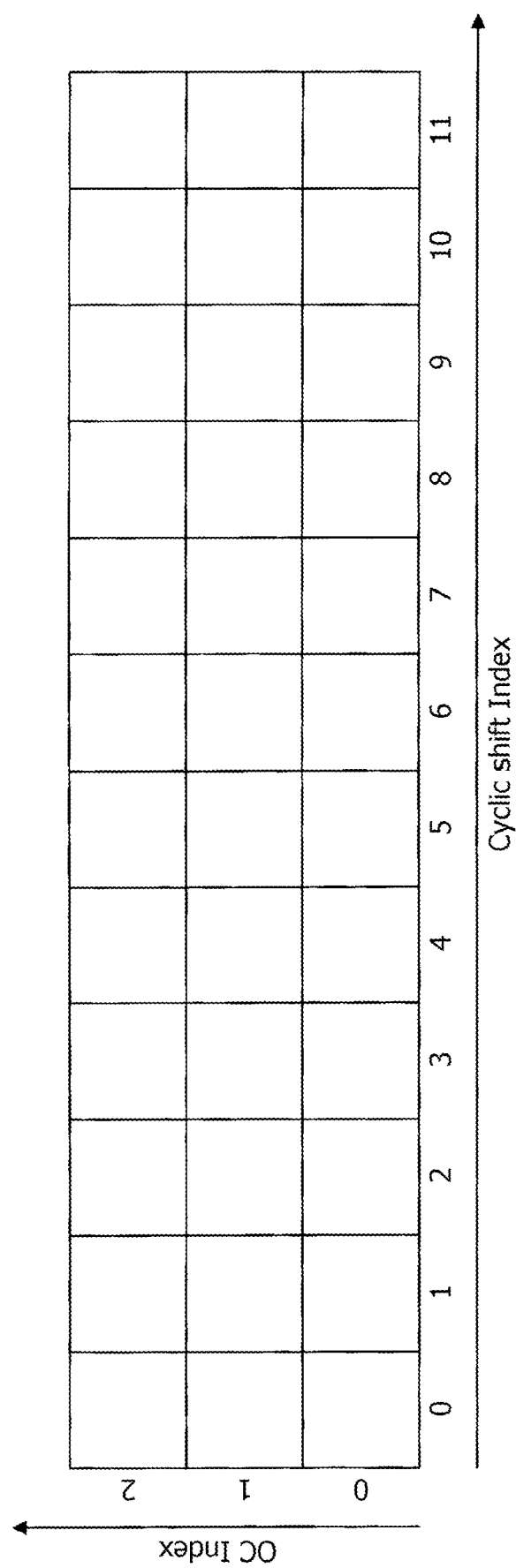
FIG. 2 illustrates an example of a PUCCH resource.

More specifically, the control unit 210 generates a ZAC sequence defined by an amount of cyclic shift corresponding to a PUCCH resource to be used, and outputs it to the primary spreading unit 212. Furthermore, the control unit 210 outputs to the secondary spreading unit 213 the intrasubframe orthogonal sequence corresponding to the PUCCH resource to be used. Furthermore, the control unit 210 outputs the frequency resource (subcarrier) corresponding to the PUCCH resource to be used to the SC-FDMA signal generation unit 214. For example, the control unit 210 may determine resources such that PUCCH resources defined by cyclic shift indexes and OC indexes used in the secondary spreading (see FIG. 2) are one-to-one related to CCE (Control Channel Element) included in PDCCH or EPDCCH for MTC in which control information associated with PDSCH (downlink data) corresponding to the ACK/NACK signal to be transmitted in a similar manner as defined in LTE Rel. 11 (see, for example, 3GPP TS 36.213 V11.5.0, "Physical layer procedures (Release 11)," December 2013), and the determined resources may be notified in advance via a higher layer.

Furthermore, in a case where it is instructed by the base station 100 to employ the MTC coverage enhancement mode in operation, the control unit 210 instructs the repetition signal generation unit 215 to perform repetition transmission of PUCCH based on the information associated with the MTC coverage enhancement mode such as the number of repetitions. Furthermore, the control unit 210 outputs the inter-subframe orthogonal sequence corresponding to the PUCCH resource to be used to the repetition signal generation unit 215 based on the information associated with the inter-subframe orthogonal code received from the PDCCH decoding unit 207 or the inter-subframe orthogonal code indicated in advance via the higher layer (not shown). Details of the control of the PUCCH resource by the control unit 210 will be described later.

The ACK/NACK generation unit 211 generates an ACK/NACK signal based on the error detection result received from the data decoding unit 209. More specifically, when an error is detected, the ACK/NACK generation unit 211 generates NACK, while when no error is detected, the ACK/NACK generation unit 211 generates ACK. The ACK/NACK generation unit 211 outputs the generated ACK/NACK signal to the primary spreading unit 212.

The primary spreading unit 212 performs primary spreading on the ACK/NACK signal and the reference signal using the ZAC sequence and the amount of cyclic shift set by the control unit 210, and the primary spreading unit 212 outputs the resultant primarily spread ACK/NACK signal and the reference signal to the secondary spreading unit 213.

The secondary spreading unit 213 performs secondary spreading on the ACK/NACK signal and the reference signal using the intrasubframe orthogonal sequence set by the control unit 210, and the secondary spreading unit 213 outputs the resultant secondarily-spread signal to the SC-FDMA signal generation unit 214.

The SC-FDMA signal generation unit 214 performs, using the frequency resource set by the control unit 210, mapping of the ACK/NACK signal and the reference signal received from the secondary spreading unit 213 to subcarriers, an IFFT process, and a CP insertion process, thereby generating a time-domain SC-FDMA signal. The SC-FDMA signal generation unit 214 outputs the generated SC-FDMA signal to the repetition signal generation unit 215.

The repetition signal generation unit 215 performs a repetition process on the SC-FDMA signal received from the SC-FDMA signal generation unit 214 using the number of repetitions set by the control unit 210 and the inter-subframe orthogonal sequence thereby generating a repetition signal. Furthermore, the repetition signal generation unit 215 multiplies, in each subframe, the repetition signal to be repetitively transmitted over multiple subframes by one of components of the inter-subframe orthogonal sequence. The repetition signal generation unit 215 outputs the repetition signal spread with the inter-subframe orthogonal sequence to the transmission unit 216. Note that in a case where the terminal 200 is not instructed by the base station 100 to operate in the MTC coverage enhancement mode, the repetition signal generation unit 215 transmits the SC-FDMA signal received from the SC-FDMA signal generation unit 214 to the transmission unit 216 directly without performing the repetition process.

The transmission unit 216 performs the RF process such as the D/A conversion, the up-conversion, and the like on the signal received from the repetition signal generation unit 215, and the transmission unit 216 transmits a radio signal to the base station 100 via the antenna 201.

Operations of Base Station 100 and Terminal 200

Operations of the base station 100 and the terminal 200 configured in the above-descried manner are described below.

The following description is given for a case where the coverage enhancement mode is set for the terminal 200, and the terminal 200 repetitively transmits the ACK/NACK signal in PUCCH.

Furthermore, in the following description, it is assumed that a subframe in which the repetition transmission of the ACK/NACK signal is started has a period equal to a predetermined cell-specific or group-specific subframe length (Common SF length) X (for example, X=4 or 5), and the number of repetitions is set to an integer multiple of X (see, for example, Panasonic, 3GPP RAN1 meeting #76, R1-140498, "Proposal of common coverage enhanced subframe length," February 2012). In the following description, the number of repetitions will be referred to as NRep.

That is, in a case where the terminal 200 performs repetition NRep times, the terminal 200 repetitively transmits a 1-subframe signal over NRep subframes.

Figure 7:
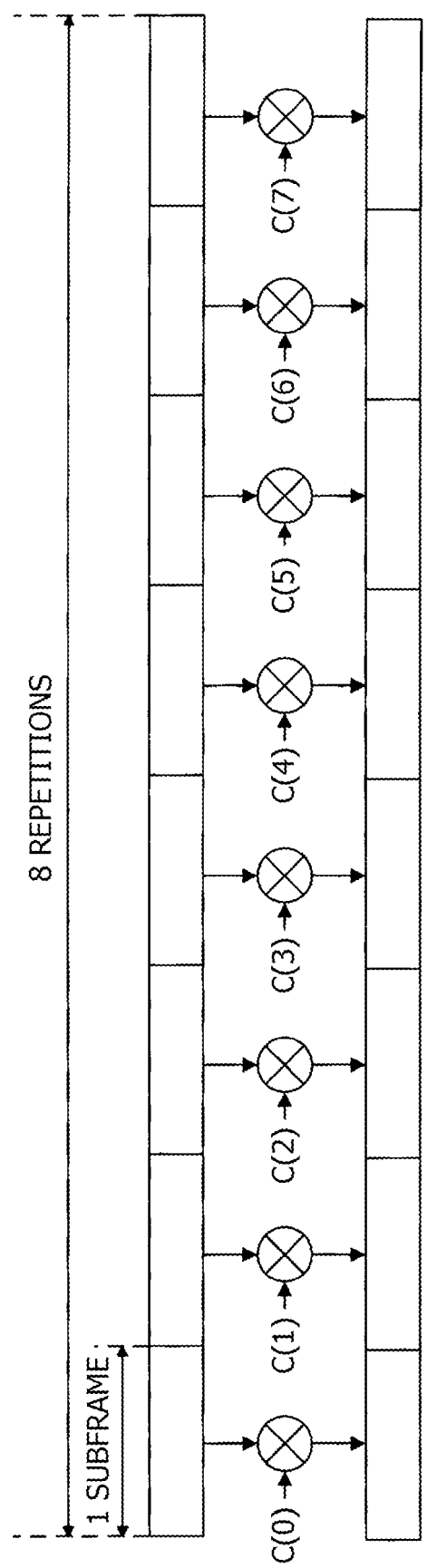
FIG. 7 illustrates a method of spreading a repetition signal according to the first embodiment.

In this process, the terminal 200 multiplies the signal to be repetitively transmitted by one of components of the inter-subframe orthogonal sequence in each subframe to be subjected to the repetition. For example, FIG. 7 illustrates an example of a method of spreading the ACK/NACK signal for a case where the number of repetitions is 8 (NRep=8), and the inter-subframe orthogonal sequence has a sequence length of 8 ($N_{SF}$=8). As shown in FIG. 7, the terminal 200 multiplies, in each subframe, the ACK/NACK signal repetitively transmitted over successive 8 subframes by one of components (C(0) to C(7)) of the inter-subframe orthogonal sequence.

As described above, each terminal 200 generates a transmission signal by multiplying, in each subframe, an ACK/NACK signal to be repetitively transmitted by one of components of one of multiple inter-subframe orthogonal sequences that are orthogonal to each other in multiple subframes. That is, the terminal 200 performs, on the ACK/NACK signal transmitted in PUCCH, the spreading process using the inter-subframe orthogonal sequence in addition to the primary spreading using one of multiple ZAC sequences separable from each other according to different cyclic shift indexes, and the secondary spreading using the intra-subframe orthogonal sequence.

Note that ACK/NACK signals transmitted from different terminals 200 are spread using ZAC sequences defined by different cyclic shift indexes, intra-subframe orthogonal sequences corresponding to different orthogonal cover indexes (OC indexes) or inter-subframe orthogonal sequences corresponding to different SF-OC indexes.

On the other hand, the base station 100 receives signals (including the ACK/NACK signal) from the terminal 200. The ACK/NACK signal transmitted from the terminal 200 for which the MTC coverage enhancement mode is set is such a signal that has been multiplied in each subframe by one of components of the inter-subframe orthogonal sequence. In this case, first, the base station 100 performs despreading and correlation processing in terms of the inter-subframe orthogonal sequence, and then performs despreading and correlation processing in terms of the intra-subframe orthogonal sequence and the ZAC sequence. This makes it possible for the base station 100 to demutiplex multiple code-multiplexed ACK/NACK signals.

Figure 8:
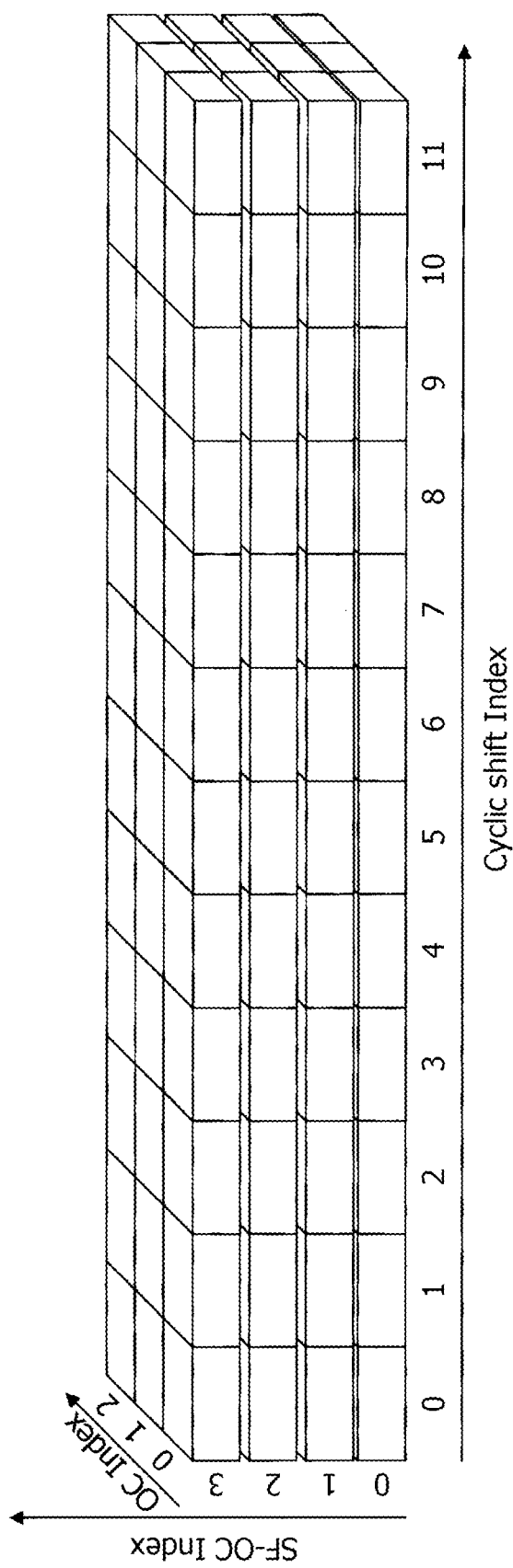
FIG. 8 illustrates an example of a PUCCH resource according to the first embodiment.

FIG. 8 illustrates an example of PUCCH resources defined by SF-OC indexes, OC indexes, and cyclic shift indexes of ZAC sequences. In FIG. 8, Walsh sequences with a sequence length of 4 are used as the inter-subframe orthogonal sequences, and Walsh sequences with a sequence length of 4 and DFT sequences with a sequence length of 3 are used as the intra-subframe orthogonal sequences. In this case, up to 4*3*12=144 PUCCH resources are available for subframes used in $N_{SF}$=4 repetitions of repetitive transmission. The number of PUCCH resources shown in FIG. 8 is greater than the number of PUCCH resources defined by the OC indexes and the cyclic shift indexes shown in FIG. 2 by a value equal to a ratio of the sequence length of the inter-subframe orthogonal sequence. However, all 144 PUCCH resources shown in FIG. 8 are not necessarily available.

As for the inter-subframe orthogonal sequences, when the sequence length is equal to a power of 2, Walsh sequences may be used. For example, in a case where $N_{SF}$=4, the inter-subframe orthogonal sequences ($C_0$, $C_1$, $C_2$, $C_3$) may be following fours: (1, 1, 1, 1); (1, −1, 1, −1); (1, 1, −1, −1); and (1, −1, −1, 1). On the other hand, in a case where the sequence length is not equal to a power of 2, complex spreading codes may be used as the inter-subframe orthogonal sequences. For example, in a case where $N_{SF}$=5, the inter-subframe orthogonal sequences ($C_0$, $C_1$, $C_2$, $C_3$, $C_4$) may be given by following five sequences: (1, 1, 1, 1, 1); (1, $e^{j2\pi/5}$, $e^{j4\pi/5}$, $e^{j6\pi/5}$, $e^{j8\pi/5}$), (1, $e^{j8\pi/5}$, $e^{j6\pi/5}$, $e^{j4\pi/5}$, $e^{j2\pi/5}$), (1, $e^{j4\pi/5}$, $e^{j8\pi/5}$, $e^{j2\pi/5}$, $e^{j6\pi/5}$), and (1, $e^{j6\pi/5}$, $e^{j2\pi/5}$, $e^{j8\pi/5}$, $e^{j4\pi/5}$). Note that as for the inter-subframe orthogonal sequences, sequences defined by different amounts of cyclic shift may be used.

Next, the sequence length $N_{SF}$ of the inter-subframe orthogonal sequence is explained below.

The sequence length $N_{SF}$ of the inter-subframe orthogonal sequence may be equal to, for example, (1) a predetermined cell-specific or group-specific value, or (2) the number of repetitions NRep. A further detailed description is given below for each cases (1) and (2).

(1) In the Case where the Sequence Length $N_{SF}$ is Equal to Cell-Specific or Group-Specific Value For example, the sequence length $N_{SF}$ of the inter-subframe orthogonal sequence may be set to be equal to Common SF length (X) as a cell-specific or group-specific value.

Figure 9:
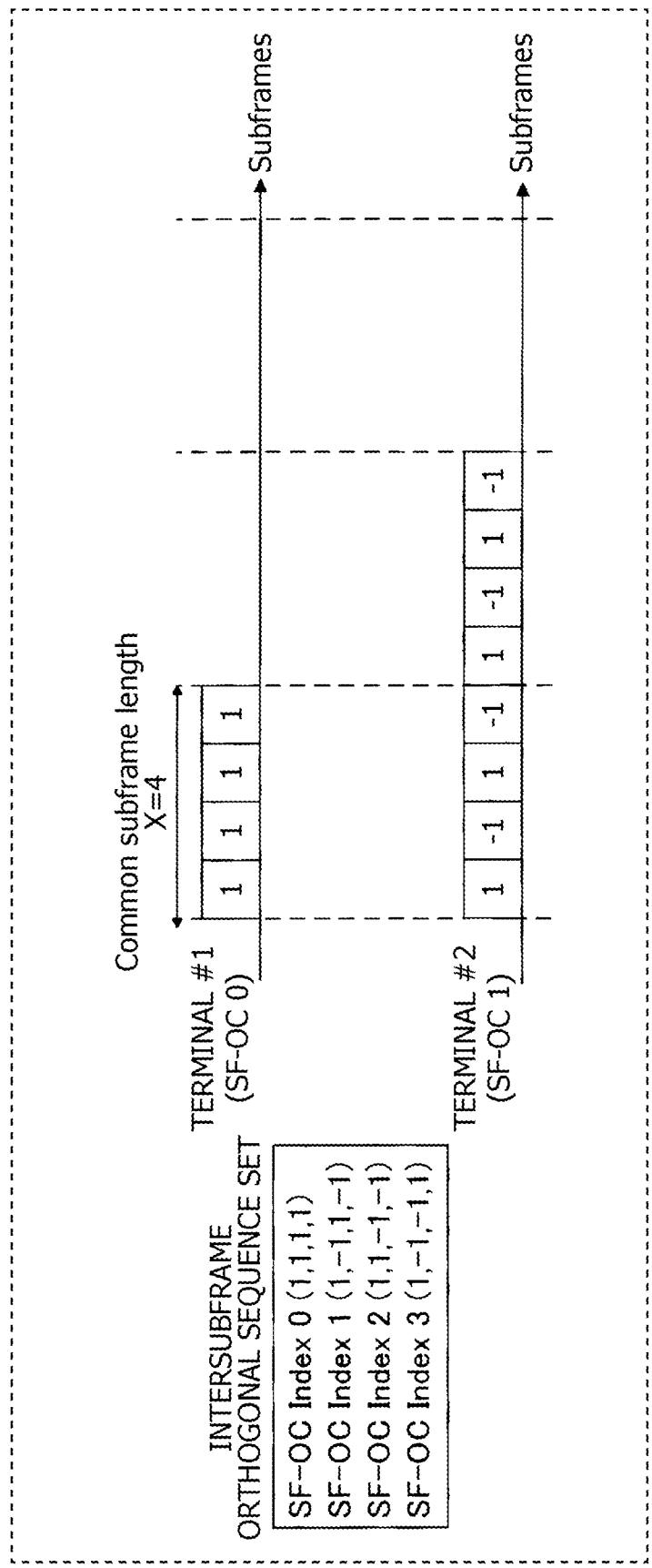
FIG. 9 illustrates an example of an inter-subframe orthogonal sequence according to the first embodiment.

FIG. 9 illustrates a case where the sequence length $N_{SF}$=X=4, the number of repetitions $N_{Rep}^{(1)}$=4 for the terminal #1, and the number of repetitions $N_{Rep}^{(2)}$=8 for the terminal #2. That is, in FIG. 9, (1, 1, 1, 1), (1, −1, 1, −1), (1, 1, −1, −1), and (1, −1, −1, 1) are defined in advance as a set of inter-subframe orthogonal sequences.

Each terminal 200 is allocated an inter-subframe orthogonal sequence to be used, in the same set of inter-subframe orthogonal sequences, regardless of the number of repetitions of the terminal 200.

As shown in FIG. 9, the terminal #1 having a number of repetitions $N_{Rep}^{(1)}$=4 is allocated an inter-subframe orthogonal sequence (1, 1, 1, 1) which is included in the set of sequences.

On the other hand, an inter-subframe orthogonal sequence (1, −1, 1, −1) which is included in the set of sequences is allocated twice to the terminal #2 with the number of repetitions $N_{Rep}^{(2)}$=8, as shown in FIG. 9. Note that in a case where the number of repetitions is larger than the sequence length of the inter-subframe orthogonal sequence, the same inter-subframe orthogonal sequence may be repetitively allocated as shown in FIG. 9, or different inter-subframe orthogonal sequences may be allocated for every Common SF length (X=4 in FIG. 9).

The upper limit of the number of terminals that can be code-multiplexed using inter-subframe orthogonal sequences is equal to $N_{SF}$=X (4 in FIG. 9).

By allocating inter-subframe orthogonal sequences for every common SF length as described above, it becomes easy to perform scheduling in terms of allocation of inter-subframe orthogonal sequences.

Figure 10:
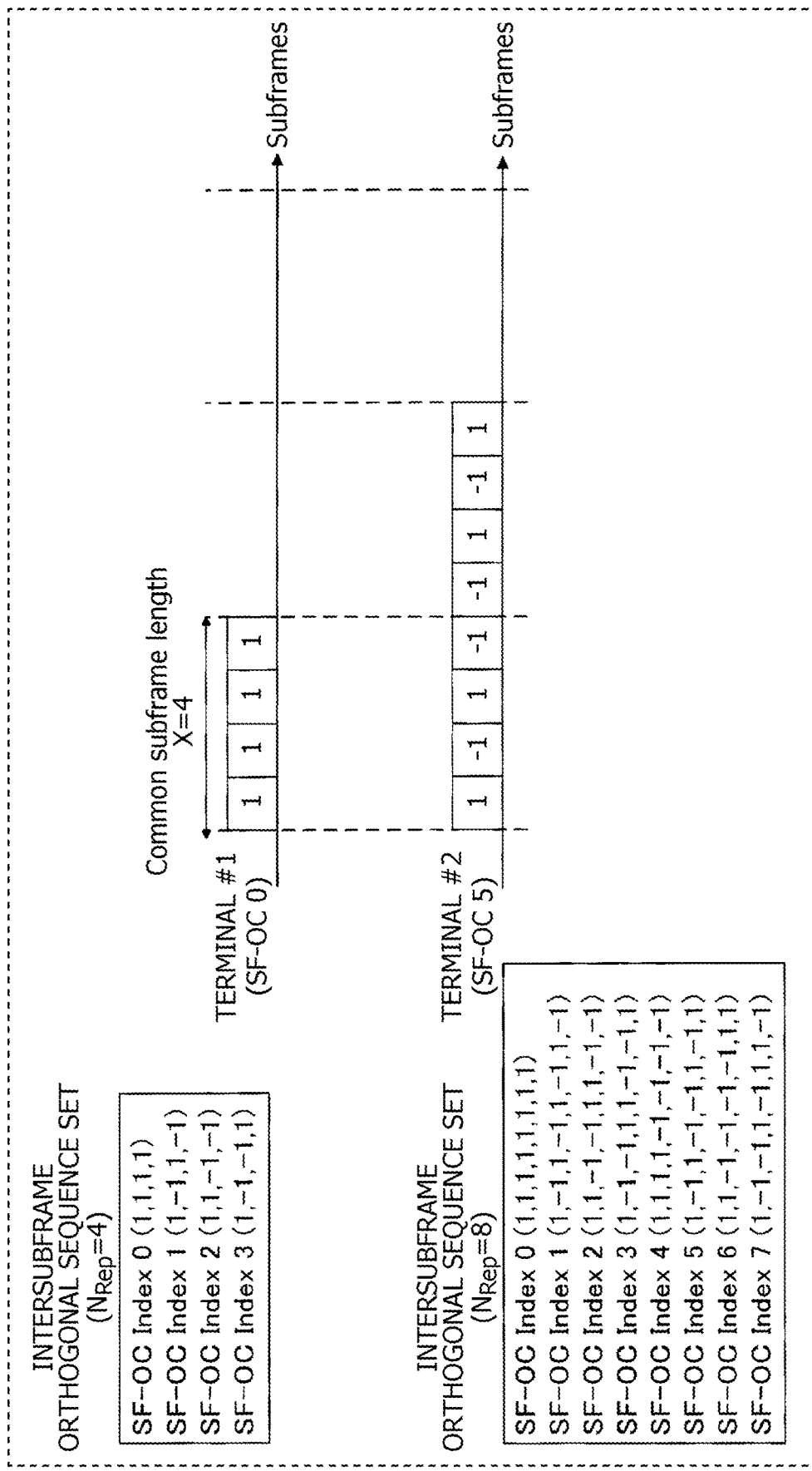
FIG. 10 illustrates an example of an inter-subframe orthogonal sequence according to the first embodiment.

(2) In the Case where the Sequence Length $N_{SF}$ is Equal to the Number of Repetitions FIG. 10 illustrates a case where the number of repetitions $N_{Rep}^{(1)}$=4 for the terminal #1, and the number of repetitions $N_{Rep}^{(2)}$=8 for the terminal #2.

In FIG. 10, a set of inter-subframe orthogonal sequences with a sequence length $N_{SF}=N_{Rep}^{(1)}$=4 is set for the terminal #1, while a set of inter-subframe orthogonal sequences with a sequence length $N_{SF}=N_{Rep}^{(2)}$=8 is set for the terminal #2. That is, to each terminal 200, one inter-subframe orthogonal sequence in the set of sequences of inter-subframe orthogonal sequences with a sequence length equal to the number of repetitions is allocated.

As shown in FIG. 10, to the terminal #1 for which the number of repetitions $N_{Rep}^{(1)}$=4, an inter-subframe orthogonal sequence (1, 1, 1, 1) in a set of sequences with a sequence length of 4 is allocated.

On the other hand, an inter-subframe orthogonal sequence (1, −1, 1, −1, −1, 1, −1, 1) in a set of sequences with a sequence length of 8 is allocated to the terminal #2 for which the number of repetitions $N_{Rep}^{(2)}$=8, as shown in FIG. 10.

The upper limit of the number of terminals that can be code-multiplexed using inter-subframe orthogonal sequences is equal to $N_{SF}=N_{Rep}^{(Max)}$. Note that $N_{Rep}^{(Max)}$ is the maximum value (8 in FIG. 10) of number of repetitions set to the respective terminals.

However, there may not be orthogonality between different sets of sequences. For example, in FIG. 10, an inter-subframe orthogonal sequence (1, 1, 1, 1) with a sequence length of 4 is not orthogonal to inter-subframe orthogonal sequences (1, 1, 1, 1, 1, 1, 1, 1) and (1, 1, 1, 1, −1, −1, −1, −1) each having a sequence length of 8. Allocation is to be performed such that non-orthogonal sequences are not allocated to different terminals 200 at the same time.

By allocating the inter-subframe orthogonal sequence such that the sequence length thereof is equal to the number of repetitions set for the terminal 200 as described above, it is possible to code-multiplex more terminals 200 than is possible in the case where the sequence length is cell-specific or group-specific value described above (FIG. 9).

The method of setting the sequence length $N_{SF}$ of the inter-subframe orthogonal sequence has been described above.

According to the present embodiment, as described above, the terminal 200 multiplies the signal to be repetitively transmitted over multiple subframes by respective components of the inter-subframe orthogonal sequence on a subframe-by-subframe basis. For example, when the ACK/NACK signal is repetitively transmitted in PUCCH, the terminal 200 performs the spreading process using the inter-subframe orthogonal sequence on the ACK/NACK signal in addition to the primary spreading and the secondary spreading. This makes it possible to provide PUCCH resources (see, for example, FIG. 8) that are up to the sequence length of the inter-subframe orthogonal sequence times more than provided in the case where the inter-subframe orthogonal sequence is not used (in the case where only the primary spreading and the secondary spreading are performed (see, for example, FIG. 2)).

Thus, even in a case where multiple subframes are occupied by one terminal to repetitively transmit a control signal or a data signal, there is a high possibility that the same subframes are allowed to be allocated to another terminal, which suppresses a reduction in spectral efficiency. Furthermore, also in a case where there is a possibility that a very large number terminals are located within a cell, as in the case of the MTC system, the increase in available resources achieved by use of the inter-subframe orthogonal sequence suppresses a shortage of resources that may occur by the increase in the number of terminals.

Thus, according to the present embodiment, it is possible to perform the repetition transmission while suppressing a reduction in spectral efficiency and resource shortage.

Note that in the embodiment described above, repetition transmission of the ACK/NACK signal in PUCCH is taken as an example. However, multiplying the signal to be repetitively transmitted by the orthogonal sequence on a subframe-by-subframe can also be applied to a channel other than PUCCH (for example, PUSCH, PDCCH or EPDCCH for MTC, PHICH, PCFICH, PDSCH, and PRACH). Note that in a case where the scheme of multiplying the signal to be repetitively transmitted by the orthogonal sequence on a subframe-by-subframe basis is applied to another channel (for example, PUSCH) that is not subjected to the primary spreading or the secondary spreading, only spreading process within multiple subframes using the inter-subframe orthogonal sequence is performed without performing the primary spreading or the secondary spreading described above.

Second Embodiment

In a second embodiment, a description is given below as to methods of indicating the inter-subframe orthogonal sequence described in the first embodiment.

The basic configurations of the base station and the terminal according to the present embodiment are similar to those according to the first embodiment, and thus the following description is given with reference to FIG. 5 (base station 100) and FIG. 6 (terminal 200).

As described in the first embodiment, the terminal 200 multiplies, in each subframe, the signal to be repetitively transmitted over multiple subframes by one of components of the inter-subframe orthogonal sequence. In this case, in order for the base station 100 to correctly detect the signals code-multiplexed using the inter-subframe orthogonal sequence, it is necessary to share information between the base station 100 and the terminal 200 in terms of which one of the orthogonal sequences is used.

In the present embodiment, the base station 100 notifies the terminal 200 of the inter-subframe orthogonal sequence (SF-OC index) to be used in the repetition transmission by the terminal 200 for which the coverage enhancement mode is set.

In the following description, as in the first embodiment, the repetition transmission of the ACK/NACK signal in PUCCH is explained. Furthermore, in the following description, as in the first embodiment, it is assumed that a subframe in which the repetition transmission of the ACK/NACK signal is started has a predetermined cell-specific or group-specific subframe length (common SF length) X, and the number of repetitions is set to an integer multiple of X.

Furthermore, each terminal 200 uses the same PUCCH resource in repetition transmission of the ACK/NACK signal.

Figure 1:
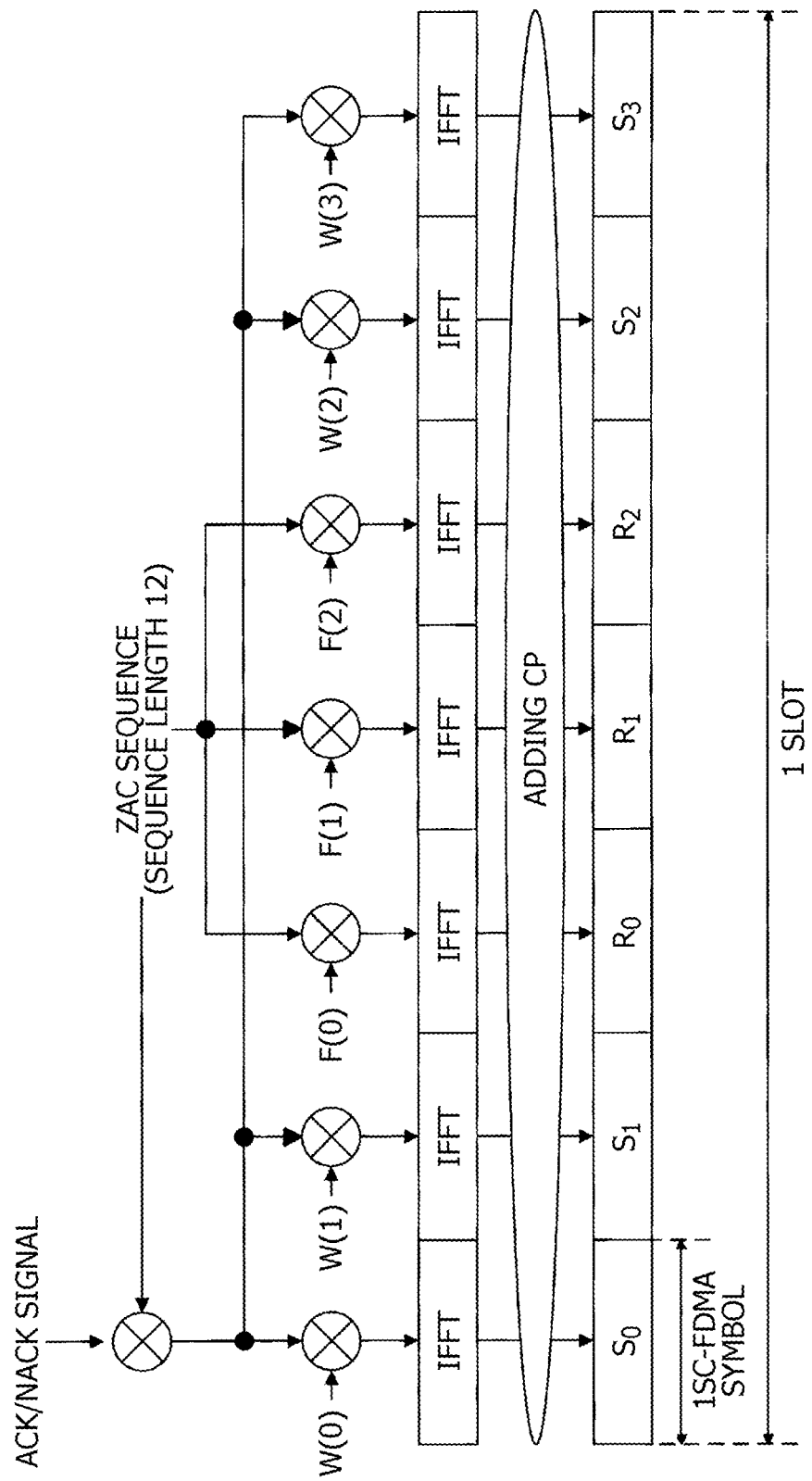
FIG. 1 illustrates a method of spreading a response signal and a reference signal.

Furthermore, operations of processes performed in the terminal 200 on the ACK/NACK signal in terms of the intra-subframe primary spreading and secondary spreading of the ACK/NACK signal, the repetition process, and the multiplication (spreading) of the inter-subframe orthogonal code are similar to those according to the first embodiment (see FIG. 1 and FIG. 7).

The base station 100 may dynamically indicate the orthogonal cover index of the inter-subframe orthogonal sequence (SF-OC index) using, for example, downlink control information (DCI) transmitted in PDCCH or EPDCCH for MTC used in transmitting control information associated with PDSCH (downlink data) corresponding to the ACK/NACK signal. Alternatively, the base station 100 may semi-statically indicate the orthogonal cover index of the inter-subframe orthogonal sequence (SF-OC index).

Methods of indication of the orthogonal cover index of the inter-subframe orthogonal sequence (SF-OC index) are described below for a case where the indication is performed dynamically using DCI (indication method 2-1), and for a case where the indication is performed semi-statically (indication method 2-2). As for the dynamic indication methods using DCI, six indication methods 2-1-1 to 2-1-6 are described below. As for the semi-static indication methods, three indication methods 2-2-1 to 2-2-3 are described below.

Indication Method 2-1-1

In the indication method 2-1-1, a field for use in indication of the SF-OC index is added to the DCI format.

That is, the base station 100 indicates the terminal 200 of the inter-subframe orthogonal sequence by using the newly added field.

In a case where the sequence length of the inter-subframe orthogonal sequence is $N_{SF}$, it is necessary to provide an additional field with a ceil($\log_2 N_{SF}$) bits. Note that the function "ceil(X)" represents a ceiling function that returns a smallest integer equal to or greater than X. For example, in a case where sequence length $N_{SF}=8$, a 3-bit additional field is necessary.

Note that in this indication method, the field for the indication of the SF-OC index may be newly added to the an existing DCI format, or a DCI format for the MTC coverage enhancement mode may be newly defined so as to include the field for the indication of the SF-OC index.

Indication Method 2-1-2

In the MTC coverage enhancement mode, in order to achieve an expansion of the communication area, the number of resource blocks (RBs) allocated to each terminal 200 may be limited to a smaller value than in the normal mode. One of reasons for this is, for example, that transmit power may be concentrated on limited resources (RB) to achieve the expansion of the communication area.

As for the field for the indication of resource allocation information included in the existing DCI, RIV (Resource Indication Value) is used. RIV is information indicated using the number of bits corresponding to the system bandwidth. For example, in the case of localized allocation mode, RIV is indicated using ceil($\log_2(N_{RB}^{DL}(N_{RB}^{DL}+1)/2)$) bits, where $N_{RB}^{DL}$ represents the downlink system bandwidth. Furthermore, in the case of localized allocation mode, the value of RIV is given by following formula (1).

$$\begin{cases} RIV = N_{RB}^{DL}(L_{CRBs} - 1) + RB_{START} & \text{if } (L_{CRBs} - 1) \leq \lfloor N_{RB}^{DL}/2 \rfloor \\ RIV = N_{RB}^{DL}(N_{Rb}^{DL} - (L_{CRBs} - 1)) + \\ \quad (N_{RB}^{DL} - 1) - RB_{START} & \text{else} \end{cases} \quad (1)$$

In formula (1), $L_{CRBs}$ denotes the number of RBs allocated to the terminal 200, and $RB_{START}$ denotes a RB with the lowest frequency among the RBs allocated to the terminal 200. From the value of RIV according to formula (1), the number of RBs and allocated to the terminal 200 and the locations of the RBs are uniquely determined.

In the case where the number of RBs is limited in the above-described manner, the number of bits necessary to indicate the RBs is smaller than in the case where the number of bits is not limited. Therefore, in the case where the number of RBs is limited, it is possible to use part of the RIV field to indicate the SF-OC index.

Thus, using part of the RIV field for indicating resource allocation information in DCI of PDCCH or EPDCCH for MTC, the base station 100 indicates the information on the inter-subframe orthogonal sequence used by the terminal 200. That is, in the case where the terminal 200 performs repetition transmission, the base station 100 indicates the RB allocation information and the SF-OC index simultaneously using values of the RIV field used for the indication of the resource allocation information included in the existing DCI.

For example, SF-OC indexes are related in advance to respective values of the field (RIV field) for use in indicating existing downlink resource allocation information included in the DCI transmitted from the base station 100 to the terminal 200. More specifically, multiple inter-subframe orthogonal sequences having a possibility of being specified are indicated in advance to the terminal 200, and inter-subframe orthogonal sequences corresponding to the respective values of the field used to indicate the resource allocation information are also indicated in advance.

The multiple inter-subframe orthogonal sequences having a possibility of being specified to be used by the terminal 200 and the correspondence between the respective values of the field used for the indication of the resource allocation information and the inter-subframe orthogonal sequences may be indicated in advance using a higher layer or the like from the base station 100 to the terminal 200, or only predetermined combinations may be used.

The terminal 200 receives the inter-subframe orthogonal sequence information allocated to part of the field (RIV field) for use of the indication of the existing resource allocation information. That is, the terminal 200 identifies the RBs used in the PDSCH subframe transmission based on the value of the field for use of the indication of the resource allocation information, and the terminal 200 determines the inter-subframe orthogonal sequence corresponding to this value as the inter-subframe orthogonal sequence to be used for the repetition transmission of the ACK/NACK signal in PUCCH.

Next, a specific example of the method of indicating the SF-OC index using the field for the indication of the resource allocation information is described below.

The base station 100 indicates the number of RBs allocated to the terminal 200 and the RB with the lowest frequency among the RBs allocated to the terminal 200, by using RIV(MTC) given by the following formula (2).

$$RIV^{(MTC)} = N_{RB}^{DL}(L_{CRBs}-1) + (L_{CRBs}-1)(L_{CRBs}-2)/2 + RB_{START} \quad (2)$$

In formula (2), if the number of RBs allocated to the terminal 200 is limited to $L_{CRBs}^{(MTC)} \leq N_{RB}^{DL}$, then the number of bits necessary in the indication of the resource allocation information is given by ceil($\log_2(N_{RB}^{DL} L_{CRBs}^{(MTC)} - L_{CRBs}^{(MTC)}(L_{CRBs}^{(MTC)}-1)/2)$) bits. Therefore, the remaining bits in the field for the indication of the resource allocation information included in the existing DCI, that is, (ceil($\log_2(N_{RB}^{DL}(N_{RB}^{DL}+1)/2)$))−ceil($\log_2(N_{RB}^{DL} L_{CRBs}^{(MTC)} - L_{CRBs}^{(MTC)}(L_{CRBs}^{(MTC)}-1)/2)$)) bits can be allocated to the indication of the SF-OC index.

Figure 11:
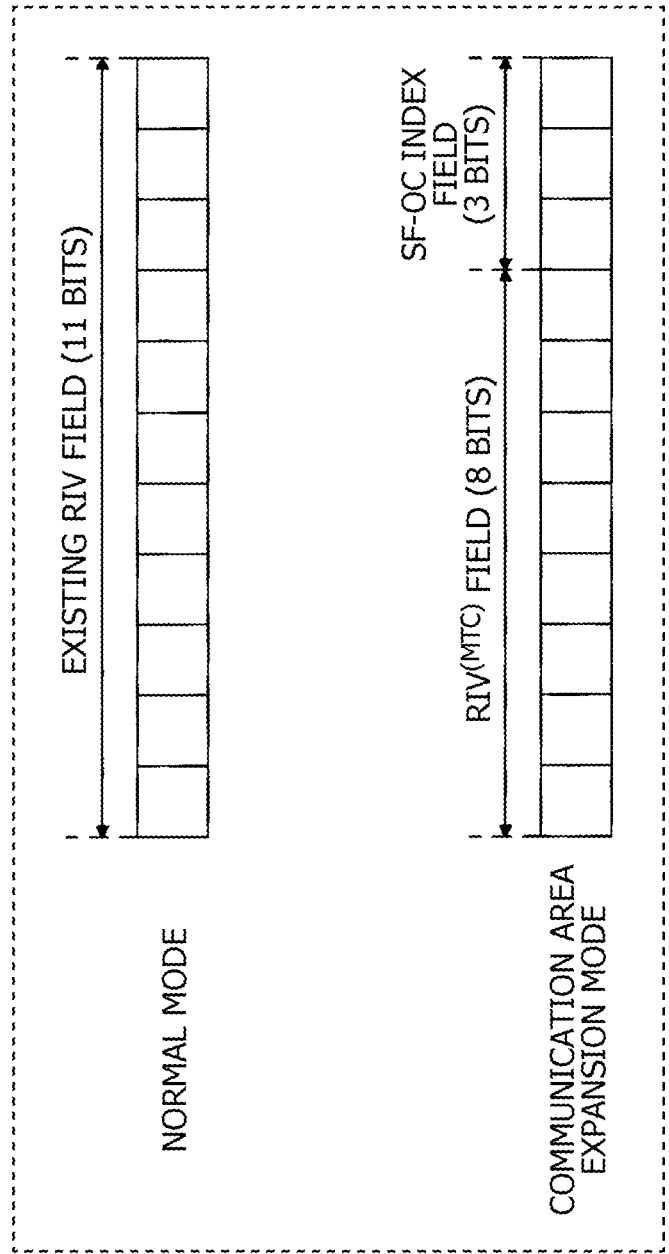
FIG. 11 illustrates an example of a RIV field according to a second embodiment.

For example, the first half (or the second half) of the field (existing RIV field) for use of the indication of the resource allocation information included in the existing DCI, that is, ceil($\log_2(N_{RB}^{DL} L_{CRBs}^{(MTC)} - L_{CRBs}^{(MTC)}(L_{CRBs}^{(MTC)}-1)/2)$) bits may be employed as the value of RIV(MTC) given by formula (2), and the remaining bits in the field, that is, (ceil($\log_2(N_{RB}^{DL}(N_{RB}^{DL}+1)/2)$))−ceil($\log_2(N_{RB}^{DL} L_{CRBs}^{(MTC)} - L_{CRBs}^{(MTC)}(L_{CRBs}^{(MTC)}-1)/2)$)) bits may be employed as the value of the SF-OC index. FIG. 11 illustrates an example in a case where the existing RIV field is represented by 11 bits, $N_{RB}^{DL}=60$, and $L_{CRBs}^{(MTC)}=4$. As shown in FIG. 11, 8 bits of 11 bits are allocated as the field for the indication of RIV(MTC), and remaining 3 bits are allocated as the field for the indication of the SF-OC index.

In the indication method 2-1-2, as described above, the indication of the SF-OC index is performed using the field (RIV field) used in the indication of the existing resource allocation information. This makes it unnecessary to use new additional bits for the indication of the SF-OC index, and thus no increase occurs in overhead of the existing DCI format.

Notification Method 2-1-3

MCS index is used for the indication of the existing MCS information. MCS index is represented, for example, by 5 bits (MCS index: 0 to 31). FIG. 12 illustrates an example of a correspondence between the 5-bit MCS index and the modulation order and the index of the transport block (TBS index). The modulation order and the index of the transport block to the terminal 200 are uniquely determined depending on the value of the MCS index as shown in FIG. 12.

In the MTC coverage enhancement mode, MCS (the number of modulation levels) used by each terminal 200 to expand the communication area may be limited to lower-order modulation such as QPSK without using higher-order modulation such as 16QAM, 64QAM, or the like. For example, in FIG. 12, MCS indexes corresponding to 16QAM, 64QAM, or the like ($Q_m$=4, 6) may not be used in the MTC coverage enhancement mode. Thus, MCS indexes that are not used in the MTC coverage enhancement mode can be used for the indication of the SF-OC index.

In view of the above, using part of the field for the indication of MCS information in DCI of PDCCH or EPDCCH for MTC, the base station 100 indicates information on the inter-subframe orthogonal sequence to be used by the terminal 200. That is, in the case where the terminal 200 performs repetition transmission, the base station 100 indicates the MCS and the SF-OC index simultaneously using values of the field used for the indication of the MCS information included in the existing DCI.

For example, SF-OC indexes are related in advance to respective values of the field used for the indication of the existing downlink MCS information included in the DCI transmitted from the base station 100 to the terminal 200. More specifically, multiple inter-subframe orthogonal sequences having a possibility of being specified are indicated in advance to the terminal 200, and inter-subframe orthogonal sequences corresponding to the respective values of the field used for the indication of the MCS information are also indicated in advance.

The multiple inter-subframe orthogonal sequences having a possibility of being specified to be used by the terminal 200 and the correspondence between the respective values of the field used for the indication of the MCS information and the inter-subframe orthogonal sequences may be indicated in advance using a higher layer or the like from the base station 100 to the terminal 200, or only predetermined combinations may be used.

The terminal 200 receives the inter-subframe orthogonal sequence information allocated to part of the field used for the indication of the existing MCS information. That is, the terminal 200 identifies the MCS used in the PDSCH subframe transmission based on the value of the field for use of the indication of the MCS information, and the terminal 200 determines the inter-subframe orthogonal sequence corresponding to this value as the inter-subframe orthogonal sequence to be used for the repetition transmission of the ACK/NACK signal in PUCCH.

Next, a specific example of the method of indicating the SF-OC index using the field for the indication of the MCS information is described below.

For example, the base station 100 limits the MCS for the terminal 200, for which the MTC coverage enhancement mode is set, to four MCSs (that is, to two bits) of MCS index=0 to 3 shown in FIG. 12. In this case, for example, 2 bits of the first half (or the second half) of the field for the indication of the MCS information included in the existing DCI may be employed as the value of the MCS index in the MTC coverage enhancement mode, and remaining 3 bits may be employed as the value of the SF-OC index.

In the indication method 2-1-3, as described above, the indication of the SF-OC index is performed using the field used for the indication of the existing MCS information. This makes it unnecessary to use new additional bits for the indication of the SF-OC index, and thus no increase occurs in overhead of the existing DCI format.

Notification Method 2-1-4

In the MTC coverage enhancement mode, repetition transmission is performed, and thus the number of HARQ processes may be limited to a smaller value than in the normal mode (in which repetition transmission is not performed).

In the normal mode, for example, the number of HARQ processes is 8, and 3 bits are used in the indication of HARQ process number.

In the case where the number of HARQ processes is limited as described above, part of the field for use for the indication of the HARQ process number included in the existing DCI can be used to indicate the SF-OC index.

Thus, the base station 100 performs the indication of the information on the inter-subframe orthogonal sequence to be used by the terminal 200 by using part of the field for use for the indication of the HARQ process number in DCI of PDCCH or EPDCCH for MTC. That is, in the case where the terminal 200 performs repetition transmission, the base station 100 indicates the HARQ process number and the SF-OC index simultaneously using values of the field used for the indication of the HARQ process number included in the existing DCI.

For example, SF-OC indexes are related in advance to respective values of the field used for the indication of the existing downlink HARQ process number included in the DCI transmitted from the base station 100 to the terminal 200. More specifically, multiple inter-subframe orthogonal sequences having a possibility of being specified are indicated in advance to the terminal 200, and inter-subframe orthogonal sequences corresponding to the respective values of the field used for the indication of the HARQ process number are also indicated in advance.

The multiple inter-subframe orthogonal sequences having a possibility of being specified to be used by the terminal 200 and the correspondence between the respective values of the field used for the indication of the HARQ process number and the inter-subframe orthogonal sequences may be indicated in advance using a higher layer or the like from the base station 100 to the terminal 200, or only predetermined combinations may be used.

The terminal 200 receives the inter-subframe orthogonal sequence information allocated to part of the field for use of the indication of the existing HARQ process number. That is, the terminal 200 identifies the HARQ process number used in the PDSCH subframe transmission based on the value of the field for use of the indication of the HARQ process number, and the terminal 200 determines the inter-subframe orthogonal sequence corresponding to this value as the inter-subframe orthogonal sequence to be used for the repetition transmission of the ACK/NACK signal in PUCCH.

Next, a specific example of the method of indicating the SF-OC index using the field for use for the indication of the HARQ process number is described below.

For example, the base station 100 limits the HARQ process numbers for the terminal 200, for which the MTC coverage enhancement mode is set, to two HARQ process numbers (that is, to 1 bit), that is, HARQ process number 0 and 1. In this case, for example, 1 bit of the first half (or the second half) of the field for use for the indication of the HARQ process number included in the existing DCI may be employed as the value of the HARQ process number in the MTC coverage enhancement mode, and remaining 2 bits may be employed as the value of the SF-OC index.

In the indication method 2-1-4, as described above, the indication of the SF-OC index is performed using the field used for the indication of the existing HARQ process number. This makes it unnecessary to use new additional bits for the indication of the SF-OC index, and thus no increase occurs in overhead of the existing DCI format.

Notification Method 2-1-5

In the MTC coverage enhancement mode, to obtain a frequency diversity effect, transmission modes may be limited to a distributed RB transmission mode (distributed RB assignment).

Note that the transmission modes includes a localized RB transmission mode (localized RB assignment) in addition to the distributed RB transmission mode. Therefore, in the normal mode, 1 bit is used to indicate the two transmission modes. For example, the transmission mode is indicated by a localized/distributed VRB assignment flag (1 bit) included in the existing DCI.

In the case where the transmission mode is limited as described above, the localized/distributed VRB assignment flag included in the existing DCI can be used for the indication of the SF-OC index.

Thus, the base station 100 the base station 100 indicates information (SF-OC index) on the inter-subframe orthogonal sequence to be used by the terminal 200 by using the entire field for the indication of the transmission mode (localized/distributed VRB assignment flag) in DCI of PDCCH.

For example, SF-OC indexes are related in advance to the respective localized/distributed VRB assignment flags included in DCI transmitted from the base station 100 to the terminal 200. More specifically, multiple inter-subframe orthogonal sequences having a possibility of being specified are indicated in advance to the terminal 200, and furthermore inter-subframe orthogonal sequences corresponding to the respective values of the localized/distributed VRB assignment flag are also indicated in advance.

The multiple inter-subframe orthogonal sequences having a possibility of being specified to be used by the terminal 200 and the correspondence between the respective values of the localized/distributed VRB assignment flag and the inter-subframe orthogonal sequences may be indicated in advance using a higher layer or the like from the base station 100 to the terminal 200, or only predetermined combinations may be used.

The terminal 200 receives the inter-subframe orthogonal sequence information allocated to the whole field (the localized/distributed VRB assignment flag) used for the indication of the existing transmission mode. That is, in the case where the terminal 200 performs repetition transmission, the terminal 200 sets the distributed RB transmission mode as the transmission mode regardless of the value of the localized/distributed VRB assignment flag. Furthermore, the terminal 200 determines the inter-subframe orthogonal sequence corresponding to the value of the localized/distributed VRB assignment flag as the inter-subframe orthogonal sequence to be used for the repetition transmission of the ACK/NACK signal in PUCCH.

In the indication method 2-1-5, as described above, the indication of the SF-OC index is performed using the existing localized/distributed VRB assignment flag. This makes it unnecessary to use new additional bits for the indication of the SF-OC index, and thus no increase occurs in overhead of the existing DCI format.

Notification Method 2-1-6

In the MTC coverage enhancement mode, to compensate for a communication area, the terminal 200 may always use the maximum power in transmission.

Note that in the normal mode, the indication of the transmit power is performed using a 2-bit field for transmit power control (TPC).

In the case where the transmit power is always equal to the maxim power as described above, the field for the TPC included in the existing DCI can be used to indicate the SF-OC index.

Thus, the base station 100 performs the indication of the information on the inter-subframe orthogonal sequence to be used by the terminal 200 by using the whole field for TCP in DCI of PDCCH or EPDCCH for MTC.

For example, SF-OC indexes are related in advance to respective values of the field for TPC included in DCI transmitted from the base station 100 to the terminal 200. More specifically, multiple inter-subframe orthogonal sequences having a possibility of being specified are indicated in advance to the terminal 200, and inter-subframe orthogonal sequences corresponding to the respective values of the field for TPC are also indicated in advance.

The multiple inter-subframe orthogonal sequences having a possibility of being specified to be used by the terminal 200 and the correspondence between the respective values of the field for TPC and the inter-subframe orthogonal sequences may be indicated in advance using a higher layer or the like from the base station 100 to the terminal 200, or only predetermined combinations may be used.

The terminal 200 receives the inter-subframe orthogonal sequence information allocated to the whole existing field for TPC. That is, in the case where the terminal 200 performs repetition transmission, the base station 200 sets the transmit power to the maximum power regardless of the value of the field for TPC. Furthermore, the terminal 200 determines the inter-subframe orthogonal sequence corresponding to the value of the field for TPC as the inter-subframe orthogonal sequence to be used for the repetition transmission of the ACK/NACK signal in PUCCH.

In the indication method 2-1-6, as described above, the indication of the SF-OC index is performed using the existing field for TPC. This makes it unnecessary to use new additional bits for the indication of the SF-OC index, and thus no increase occurs in overhead of the existing DCI format.

In the five indication methods, that is, the indication method 2-1-2 to the indication method 2-1-6, of existing fields in the DCI format used by the terminal 200 which is not set in the MTC coverage enhancement mode, a field that may not be used in the MTC coverage enhancement mode is used as a field for the indication of the SF-OC index. Thus, in these methods, it is not necessary to add a new field to the existing DCI format, and thus it is possible to perform the indication of the SF-OC index without causing an increase in overhead of the existing DCI format.

Note that two or more of the indication method 2-1-2 to the indication method 2-1-6 may be combined. For example, in a case where any single indication method alone cannot perform the indication of the SF-OC index, the indication of the SF-OC index may be performed using a combination of fields used in indication methods. For example, in a case where 3 bits are necessary to perform the indication of the SF-OC index, the localized/distributed VRB assignment flag (1 bit) according to the indication method 2-1-5 and the field for TPC (2 bits) according to the indication method 2-1-6 may be used to perform the indication of the SF-OC index.

In the indication method 2-1-1 to the indication method 2-1-6 described above, the transmission of the ACK/NACK signal in PUCCH is taken as an example. However, the method of dynamically indicating the SF-OC index using DCI may also be applied to channels (PUSCH, PDCCH or EPDCCH for MTC, PHICH, PCFICH, PDSCH and PRACH) other than PDCCH. Furthermore, in the indication method 2-1-1 to the indication method 2-1-6 described above, DCI for allocating downlink is taken as an example. However, DCI for allocating uplink may be used.

Indication Method 2-2-1

The base station 100 uses a higher layer signal to indicate the orthogonal cover index of the inter-subframe orthogonal sequence (SF-OC index) to be used by the terminal 200.

That is, the SF-OC index is explicitly indicated in advance using a higher layer signal transmitted from the base station 100 to the terminal 200.

The terminal 200 receives the higher layer signal transmitted from the base station 100 and uses an inter-subframe orthogonal sequence indicated by the received higher layer signal as the inter-subframe orthogonal sequence to be used in the repetition transmission in PUCCH.

As described above, by semi-statically indicating a value of the SF-OC index by using the higher layer signal as with the indication method 2-2-1, it is possible to prevent an overhead of DCI.

Furthermore, as described above, because there is a DCI field that is not used in the MTC coverage enhancement mode, it is possible to reduce the size of DCI in the MTC coverage enhancement mode by semi-statically indicating a value of the SF-OC index by using the higher layer signal.

Indication Method 2-2-2

The terminal 200 determines the index of the inter-subframe orthogonal sequence (SF-OC index) based on a terminal ID.

In this case, multiple inter-subframe orthogonal sequences (SF-OC indexes) are related in advance to terminal IDs. For example, the SF-OC index $N_{SF}$ is determined according to a following formula (3).

$$n_{SF} = \text{UEID} \bmod N_{SF} \quad (3)$$

In formula (3), UEID denotes the terminal ID. As for the terminal ID, for example, C-RNTI included in PDCCH may be used.

That is, in the multiple inter-subframe orthogonal sequences, a sequence corresponding to the terminal ID (C-RNTI) indicated from the base station 100 is set, by the terminal 200, as the inter-subframe orthogonal sequence used by the terminal 200.

To prevent a collision between successive PUCCH resources, a hash function may be used to achieve randomization between repetitions.

In the indication method 2-2-2, as described above, by semi-statically indicating the value of SF-OC index using RNTI, indicating the terminal ID, included in PDCCH or EPDCCH for MTC, it becomes unnecessary to perform additional signaling, and thus it is possible to prevent an overhead of DCI.

Notification Method 2-2-3

In LTE Rel. 11, in a case where a transmission of a random access signal is requested, PDCCH in DCI format 1A is used. However, part of the DCI format 1A is not used, and 0 or 1 is inserted.

Thus, in the indication method 2-2-3, a field that is not used in PDCCH or EPDCCH for MTC in which a transmission of a random access signal is requested is used as a field for the indication of the SF-OC index. That is, the base station 100 indicates an orthogonal cover index of an inter-subframe orthogonal sequence (SF-OC index) by using a field that is included in fields of DCI of PDCCH or an EPDCCH for MTC used in requesting the terminal 200 to transmit a random access signal but that is not used in the requesting.

In this case, multiple inter-subframe orthogonal sequences (SF-OC indexes) are related in advance to values of the unused field in existing PDCCH or EPDCCH for MTC in which the random access signal transmission is requested.

The terminal 200 determines, as the inter-subframe orthogonal sequence for use for the repetition transmission in PUCCH, the inter-subframe orthogonal sequence corresponding to the value, indicated from the base station 100, of the particular field (the field that is not used in requesting the random access signal transmission) of DCI of PDCCH or EPDCCH for MTC used in requesting the random access signal transmission.

In the indication method 2-2-3, as described above, by semi-statically indicating the value of SF-OC index using part of the existing field of PDCCH or EPDCCH for MTC used in requesting the random access signal transmission, it becomes unnecessary to perform additional signaling, and thus it is possible to prevent an overhead of DCI.

In the indication method 2-2-1 to the indication method 2-2-3 described above, the transmission of the ACK/NACK signal in PUCCH is taken as an example. However, the method of semi-statically indicating the SF-OC index may also be applied to channels (PUSCH, PDCCH or EPDCCH for MTC, PHICH, PCFICH, PDSCH and PRACH) other than PUCCH.

The methods of indicating the orthogonal cover index of the inter-subframe orthogonal sequence (SF-OC index) have been described above.

In the present embodiment, the inter-subframe orthogonal sequence used by the terminal 200 is shared in advance between the base station 100 and the terminal 200. The orthogonal cover index of the inter-subframe orthogonal sequence used is known between the base station 100 and the terminal 200 as described above, and thus it becomes unnecessary for the base station 100 to perform the blind detection of the inter-subframe orthogonal sequence used by the terminal 200, and thus it is possible to prevent an increase in complexity of the base station 100 or the terminal 200.

The present disclosure has been described above with reference to embodiments.

In the embodiments described above, it is assumed by way of example that an aspect of the present disclosure is implemented using hardware. However, the present disclosure may be implemented using software.

Each functional block according to the embodiments described above may be typically realized by an integrated circuit such as an LSI. Each of the functional blocks may be formed individually on one chip, or part or all of the functional blocks may formed on one chip. The form of the integrated circuit is not limited to the LSI, but various other types of integrated circuits such as a system LSI, a super LSI, an ultra LSI, and the like may be employed.

Furthermore, the integrated circuit is not limited to the LSI, but the integrated circuit may be realized in the form of a dedicated circuit, a general-purpose processor, or the like. The integrated circuit may also be realized using a field programmable gate array (FPGA) LSI that is allowed to be programmed after the production of the LSI is completed, or a reconfigurable processor that is allowed to be reconfigured in terms of the connection or the setting of circuit cells in the inside of the LSI after the production of the LSI is completed.

When a new integration circuit technique other than LSI techniques are realized in the future by an advance in semiconductor technology or related technology, the functional blocks may be realized using such a new technique. A possible example of a new technique is biotechnology.

In the present disclosure, a terminal includes a generator that generates a transmission signal by multiplying, in each subframe, a signal to be repetitively transmitted over multiple subframes by one of components of one sequence of a plurality of first sequences orthogonal to each other, and a transmitter that transmits the transmission signal.

In the terminal according to the present disclosure, the signal may be a response signal, and the terminal may further include a first spreader that performs primary spreading on the response signal by using one of a plurality of second sequences defined by different cyclic shift indexes, and second spreader that performs a secondary spreading on the response signal having been subjected to the primary spreading by using one of a plurality of third sequences orthogonal to each other in a subframe, wherein the generation unit performs repetition on the secondarily-spread response signal over multiple subframes and multiplies the response signal by one of components of the first sequence in each subframe.

The terminal according to the present disclosure may further include a receiver that receives information indicating the first sequence used by the terminal, the information allocated to part or all of a field for use for indication of control information of a downlink control channel.

In the terminal according to the present disclosure, the control information may be resource allocation information, MCS information, HARQ process information, transmission mode information, or transmission power control information.

The terminal according to the present disclosure may further include a receiver that receives, using a higher layer, information indicating the first sequence used by the terminal.

In the terminal according to the present disclosure, the plurality of first sequences may be related in advance to terminal IDs, and the generation unit may set, as the first sequence used by the terminal, a sequence included in the plurality of first sequences and corresponding to the terminal ID notified from a base station.

The terminal according to the present disclosure may further include a receiver that receives information indicating the first sequence used by the terminal, the information allocated to a field that is one of fields for use in indicating downlink allocation control information requesting the terminal to transmit a random access signal and this is not used in the requesting.

In the terminal according to the present disclosure, the number of repetitions may be an integer multiple of a subframe period from which the repetition is started, and the sequence length of the first sequence may be the same as the subframe period.

In the terminal according to the present disclosure, the sequence length of the first sequence may be equal to the number of repetitions.

In the present disclosure, a base station includes a reception unit that receives a signal repetitively transmitted over multiple subframes, the signal having been multiplied in each subframe by one of components of one sequence of a plurality of first sequences orthogonal to each other, and a combining unit that generates a combined signal by combining signals of the multiple subframes using the one sequence.

In the present disclosure, a transmission method includes generating a transmission signal by multiplying, in each subframe, a signal to be repetitively transmitted over multiple subframes by one of components of one sequence of a plurality of first sequences orthogonal to each other, and transmitting the transmission signal.

In the present disclosure, a reception method includes receiving a signal repetitively transmitted over multiple subframes, the signal having been multiplied, in each subframe, by one of components of one sequence of a plurality of first sequences orthogonal to each other, and generating a combined signal by combining signals of the multiple subframes using the one sequence.

Embodiments of the present disclosure are useful in mobile communication systems.

What is claimed is:

1. A terminal comprising:
 a generator that generates a transmission signal repetitively over multiple subframes by multiplying, in each subframe, a signal by one of components of one sequence of a plurality of first sequences orthogonal to each other; and
 a transmitter that transmits the transmission signal over the multiple subframes,
 wherein
 the plurality of first sequences are respectively associated with terminal IDs, and
 the generator sets, as the one sequence used by the terminal, a sequence included in the plurality of first sequences and corresponding to a terminal ID indicated by a base station.

2. The terminal according to claim 1, wherein
 the signal is a response signal,
 and wherein the terminal further comprises
 a first spreader that performs primary spreading on the response signal by using one of a plurality of second sequences defined by different cyclic shift indexes; and
 a second spreader that performs secondary spreading on the response signal having been subjected to the primary spreading by using one of a plurality of third sequences orthogonal to each other in a subframe,
 wherein the generator generates the transmission signal by multiplying, in each subframe, the secondarily-spread response signal by one of components of the one sequence.

3. The terminal according to claim 1, further comprising a receiver that receives information indicating the one sequence used by the terminal, the information allocated to part or all of a field for use for indication of control information of a downlink control channel.

4. The terminal according to claim 3, wherein the control information is resource allocation information, MCS information, HARQ process information, transmission mode information, or transmission power control information.

5. The terminal according to claim 1, further comprising a receiver that receives, using a higher layer, information indicating the one sequence used by the terminal.

6. The terminal according to claim 1, further comprising a receiver that receives information indicating the one sequence used by the terminal, the information allocated to a field that is an unused one of fields for use in indicating downlink allocation control information requesting the terminal to transmit a random access signal.

7. The terminal according to claim 1, wherein
a number of the repetitions is an integer multiple of a period of a subframe from which the repetitions may start, and
a sequence length of the first sequence is equal to said period.

8. The terminal according to claim 1, wherein a sequence length of the first sequence is equal to a number of the repetitions.

9. A transmission method comprising:
generating a transmission signal repetitively over multiple subframes by multiplying, in each subframe, a signal by one of components of one sequence of a plurality of first sequences orthogonal to each other; and
transmitting the transmission signal over the multiple subframes,
wherein
the plurality of first sequences are respectively associated with terminal IDs, and
the generating step includes setting, as the one sequence used by the terminal, a sequence included in the plurality of first sequences and corresponding to a terminal ID indicated by a base station.

10. The transmission method according to claim 9, wherein
the signal is a response signal,
and wherein the transmission method further comprises
primarily spreading the response signal by using one of a plurality of second sequences defined by different cyclic shift indexes; and
secondarily spreading the response signal having been subjected to the primary spreading by using one of a plurality of third sequences orthogonal to each other in a subframe;
and wherein the generating step includes generating the transmission signal by multiplying, in each subframe, the secondarily-spread response signal by one of components of the one sequence.

11. The transmission method according to claim 9, further comprising:
receiving information indicating the one sequence used in the generating step, the information allocated to part or all of a field for use for indication of control information of a downlink control channel.

12. The transmission method according to claim 11, wherein
the control information is resource allocation information, MCS information, HARQ process information, transmission mode information, or transmission power control information.

13. The transmission method according to claim 9, further comprising:
receiving, using a higher layer, information indicating the one sequence used in the generating step.

14. The transmission method according to claim 9, further comprising:
receiving information indicating the one sequence used in the generating step, the information allocated to a field that is an unused one of fields for use in indicating downlink allocation control information requesting a terminal to transmit a random access signal.

15. The transmission method according to claim 9, wherein
a number of the repetitions is an integer multiple of a period of a subframe from which the repetitions may start, and
a sequence length of the first sequence is equal to said period.

16. The transmission method according to claim 9, wherein a sequence length of the first sequence is equal to a number of the repetitions.

17. A base station comprising:
a receiver that receives a signal repetitively transmitted over multiple subframes from a terminal, the signal having been multiplied by the terminal, in each subframe, by one of components of one sequence of a plurality of first sequences orthogonal to each other; and
a combiner that generates a combined signal by combining signals of the multiple subframes using the one sequence,
wherein
the plurality of first sequences are respectively associated with terminal IDs, and
the one sequence used by the terminal and used in the generating step is a sequence included in the plurality of first sequences and corresponding to a terminal ID notified to the terminal by the base station.

18. The base station according to claim 17, wherein
a number of the repetitions is an integer multiple of a period of a subframe from which the repetitions may start, and
a sequence length of the first sequence is equal to said period.

19. A reception method comprising:
receiving a signal repetitively transmitted over multiple subframes from a terminal, the signal having been multiplied by the terminal, in each subframe, by one of components of one sequence of a plurality of first sequences orthogonal to each other; and
generating a combined signal by combining signals of the multiple subframes using the one sequence,
wherein
the plurality of first sequences are respectively associated with terminal IDs, and
the one sequence used by the terminal and used in the generating step is a sequence included in the plurality of first sequences and corresponding to a terminal ID associated with the terminal.

20. The reception method according to claim 19, wherein
a number of the repetitions is an integer multiple of a period of a subframe from which the repetitions may start, and
a sequence length of the first sequence is equal to said period.

* * * * *